US011460973B1

(12) United States Patent
Mealin et al.

(10) Patent No.: US 11,460,973 B1
(45) Date of Patent: Oct. 4, 2022

(54) USER INTERFACES FOR CONVERTING NODE-LINK DATA INTO AUDIO OUTPUTS

(71) Applicant: SAS Institute Inc., Cary, NC (US)

(72) Inventors: Sean Patrick Mealin, Cary, NC (US); Claude Edward Summers, II, Cary, NC (US); Mitchel Stanley Soltys, II, Cary, NC (US); Ralph Johnson Marshall, Jr., Hillsborough, NC (US); Jesse Daniel Sookne, Cary, NC (US); Brice Joseph Smith, Cary, NC (US); Gregory David Kraus, Cary, NC (US); Eric Colin Bolender, Raleigh, NC (US); Julianna Elizabeth Langston, Cary, NC (US); Lisa Beth Morton Robinson, Cary, NC (US)

(73) Assignee: SAS INSTITUTE INC:., Cary, NC (US)

( * ) Notice: Subject to any disclaimer, the term of this patent is extended or adjusted under 35 U.S.C. 154(b) by 0 days.

(21) Appl. No.: 17/717,661

(22) Filed: Apr. 11, 2022

(51) Int. Cl.
*G06F 3/04817* (2022.01)
*G06F 3/16* (2006.01)
*G06F 3/14* (2006.01)

(52) U.S. Cl.
CPC .......... *G06F 3/04817* (2013.01); *G06F 3/14* (2013.01); *G06F 3/162* (2013.01)

(58) Field of Classification Search
CPC ......... G06F 3/04817; G06F 3/14; G06F 3/162
See application file for complete search history.

(56) References Cited

U.S. PATENT DOCUMENTS

| 5,097,326 A | 3/1992 | Meijer |
| 5,470,233 A | 11/1995 | Fruchterman et al. |

(Continued)

FOREIGN PATENT DOCUMENTS

| EP | 0667567 | 8/1995 |
| EP | 1369839 | 12/2003 |
| HU | 0104409 | 3/2002 |

OTHER PUBLICATIONS

Desmos: About, Available Online at: https://www.desmos.com/about, Accessed from Internet on Mar. 18, 2020, 2 pages.

(Continued)

*Primary Examiner* — Beau D Spratt
(74) *Attorney, Agent, or Firm* — Kilpatrick Townsend & Stockton LLP

(57) ABSTRACT

Node-link data can be converted into audio outputs. For example, a system can generate a graphical user interface (GUI) depicting a node-link diagram having nodes and links. The GUI can include a virtual reference point in the node-link diagram and a virtual control element that is rotatable around the virtual reference point by a user to contact one or more of the nodes in the node-link diagram. The system can receive user input for rotating the virtual control element around the virtual reference point, which can generate a contact between the virtual control element and a particular node of the node-link diagram. In response to detecting the contact, the system can determine a sound characteristic configured to indicate an attribute associated with the particular node. The system can then generate a sound having the sound characteristic, for example to assist the user in exploring the node-link diagram.

30 Claims, 22 Drawing Sheets

(56) References Cited

U.S. PATENT DOCUMENTS

| | | | |
|---|---|---|---|
| 5,790,820 | A | 8/1998 | Vayda et al. |
| 5,880,743 | A | 3/1999 | Moran et al. |
| 6,324,511 | B1 | 11/2001 | Kiraly et al. |
| 6,587,131 | B1 | 7/2003 | Nakai et al. |
| 6,963,656 | B1 | 11/2005 | Persaud et al. |
| 7,506,275 | B2 | 3/2009 | Conradt et al. |
| 7,673,241 | B2 | 3/2010 | Sun et al. |
| 7,913,188 | B1 | 3/2011 | Krenz et al. |
| 9,165,478 | B2 | 10/2015 | Carro et al. |
| 9,785,336 | B2 | 10/2017 | Summers, II et al. |
| 10,191,979 | B2 | 1/2019 | Summers, II et al. |
| 10,583,067 | B2 | 3/2020 | Kline et al. |
| 11,093,548 | B1* | 8/2021 | Pang .................. G06F 16/2477 |
| 11,257,396 | B2 | 2/2022 | Summers, II et al. |
| 2003/0038797 | A1 | 2/2003 | Vazzana |
| 2003/0098803 | A1 | 5/2003 | Gourgey et al. |
| 2004/0021701 | A1 | 2/2004 | Iwema et al. |
| 2004/0141597 | A1 | 7/2004 | Giacomelli |
| 2004/0218451 | A1 | 11/2004 | Said et al. |
| 2005/0083300 | A1 | 4/2005 | Castle |
| 2006/0026537 | A1 | 2/2006 | L'Heureux |
| 2006/0061780 | A1 | 3/2006 | Chen et al. |
| 2006/0114224 | A1 | 6/2006 | Ninomiya |
| 2010/0241350 | A1 | 9/2010 | Cioffi et al. |
| 2011/0138340 | A1* | 6/2011 | Holm-Petersen ...... G06Q 10/06 715/854 |
| 2011/0244954 | A1 | 10/2011 | Goldman et al. |
| 2011/0301943 | A1 | 12/2011 | Patch |
| 2012/0120104 | A1 | 5/2012 | Kuhne |
| 2012/0280087 | A1 | 11/2012 | Coffman et al. |
| 2013/0042180 | A1 | 2/2013 | Sai et al. |
| 2013/0232506 | A1 | 9/2013 | Mazzoni et al. |
| 2014/0129937 | A1 | 5/2014 | Jarvinen et al. |
| 2014/0188479 | A1 | 7/2014 | Bellamy et al. |
| 2015/0338974 | A1* | 11/2015 | Stone .................. G06F 3/04845 345/173 |
| 2016/0378295 | A1* | 12/2016 | Cousins ................ G06F 3/1423 715/702 |
| 2017/0229040 | A1 | 8/2017 | Joshi et al. |
| 2017/0347219 | A1 | 11/2017 | McCauley et al. |
| 2018/0239821 | A1* | 8/2018 | Summers, II .......... G06F 3/167 |
| 2019/0166448 | A1 | 5/2019 | Laaksonen et al. |
| 2020/0132501 | A1 | 4/2020 | Czarnecki |
| 2020/0151277 | A1* | 5/2020 | Fisher ..................... G06F 16/34 |
| 2020/0167058 | A1 | 5/2020 | Ragan, Jr. |
| 2021/0383395 | A1* | 12/2021 | Galka ................. G06F 16/9024 |
| 2022/0171810 | A1* | 6/2022 | Duong ................. G09B 21/006 |
| 2022/0172211 | A1* | 6/2022 | Muthuswamy ........ G06N 20/00 |

OTHER PUBLICATIONS

Desmos: Beautiful, Free Math, Available Online at: https://www.desmos.com, Accessed from Internet on Mar. 18, 2020, 3 pages.

How to Convey Financial Charts for Users Without Sight? Bloomberg's UX Designers Explore Visual Data Through Sound, Available Online at: https://www.bloomberg.com/ux/2018/08/28/visually-impaired-working-finance-nearly-impossible-bloombergs-ux-designers-working-change/, Aug. 28, 2018, 11 pages.

Logger Pro 3: Quick Reference Manual, Vernier Software & Technology, 20 pages.

Nearby Explorer (Full) and Nearby Explorer Online for iOS User Guide, American Printing House for the Blind, Inc., Mar. 9, 2020, 67 pages.

SAS Graphics Accelerator Allows Blind People to See Graphs, Cool Blind Tech, Mar. 20, 2017, 6 pages.

SAS Visual Analytics App 8.50 for iOS: Accessibility Features, Available Online at: https://go.documentation.sas.com/?cdcId=bivwrcdc&cdcVersion=8.50_01&docsetid=bivwra11y&docsetTarget=ios_accessibility.htm&locale=en, Accessed from Internet on Mar. 18, 2020, 20 pages.

SAS® Graphics Accelerator: User's Guide, SAS, Mar. 13, 2020, 60 pages.

Software Developer Makes Corona Virus Statistics Website Accessible for the Blind and Partially Sighted, Cool Blind Tech, Apr. 11, 2020, 3 pages.

Sonification Sandbox, School of Psychology—Georgia Institute of Technology, Available Online at: sonify.psych.gatech.edu/research/sonification_sandbox/, Jul. 2009, 3 pages.

Stockgrok: A Sonic Chart Analysis Tool for Google Chrome, Available Online at: https://stockgrok.github.io/, Accessed from Internet on Apr. 27, 2020, 2 pages.

U.S. Appl. No. 17/001,195, Advisory Action dated Mar. 22, 2021, 7 pages.

U.S. Appl. No. 17/001,195, Final Office Action dated Feb. 9, 2021, 21 pages.

U.S. Appl. No. 17/001,195, Non-Final Office Action dated Nov. 25, 2020, 26 pages.

U.S. Appl. No. 17/001,195, Non-Final Office Action dated Jun. 9, 2021, 40 pages.

U.S. Appl. No. 17/001,195, Notice of Allowance dated Oct. 22, 2021, 9 pages.

Balik et al., GSK: Universally Accessible Graph SKetching, SIGCSE'13, Mar. 6-9, 2013, pp. 221-226.

Bert et al., Making Charts Accessible for People with Visual Impairments, Elsevier, Feb. 8, 2018, 18 pages.

Brock, Interactive Maps for Visually Impaired People: Design, Usability and Spatial Cognition, Thesis, Nov. 2013, 361 pages.

Donker et al., The Design of Auditory User Interfaces for Blind Users, In Proceedings of the Second Nordic Conference on Human-Computer Interaction, Available Online at: https://dl.acm.org/doi/pdf/10.1145/572020.572038, Oct. 19-23, 2002, pp. 149-155.

Heuten et al., Interactive Exploration of City Maps with Auditory Torches, IN CHI 2007 Extended Abstracts on Human Factors in Computing Systems 1959, Available Online at: https://dl.acm.org/doi/pdf/10.1145/1240866.1240932, Apr. 28-May 3, 2007, 6 pages.

Li et al., Improved Map and Scene Navigation with Gamepad Support, Available Online at: https://www.esri.com/arcgis-blog/products/js-api-arcgis/mapping/navigation-with-gamepad-support/, Sep. 27, 2018, 5 pages.

Lubbers, Adaptive Multi Modal Exploration of Music Collections, In Proc. of ISMIR'09: 10th Int. Society for Music Information Retrieval Conf., Jan. 2009, pp. 195-200.

Muir, Setting Up the Stocks App on Your iPhone, Available Online at: https://www.dummies.com/consumer-electronics/smartphones/iphone/setting-up-the-stocks-app-on-your-iphone/, Accessed from Internet on Mar. 18, 2020, 2 pages.

Stewart, Spatial Auditory Display for Acoustics and Music Collections, Available Online at: http://theleadingzero.com/research/papers/phdthesis.pdf, Jul. 2010, 185 pages.

Stewart et al., The Amblr: A Mobile Spatial Audio Music Browser, In IEEE International Conference on Multimedia and Expo, Available Online at: https://ieeexplore.ieee.org/document/6012203, Sep. 6, 2011, 6 pages.

Wise et al., Visualizing the Non-Visual: Spatial Analysis and Interaction with Information from Text Documents, IEEE Symposium on Information Visualization 1995, InfoVis 1995, Jan. 1995, pp. 51-58.

Zhao, Interactive Sonification of Abstract Data: Framework, Design Space, Evaluation, and User Tool, Available Online at: http://www.cs.umd.edu/hcil/audiomap/publications/dissertation-submitted.pdf, Apr. 24, 2006, 288 pages.

\* cited by examiner

USER INTERFACES FOR CONVERTING NODE-LINK DATA INTO AUDIO OUTPUTS

TECHNICAL FIELD

The present disclosure relates generally to user interfaces. More specifically, but not by way of limitation, this disclosure relates user interfaces for converting node-link data into audio outputs.

BACKGROUND

Graphical user interfaces (GUIs) can incorporate graphical visualizations to help a user quickly and easily understand information. Examples of graphical visualizations can include geospatial maps, graphs, and charts. But the visual nature of these graphical visualizations make them difficult or impossible to interpret for users that are blind or visually impaired.

SUMMARY

One example of the present disclosure includes a non-transitory computer-readable medium comprising program code that is executable by one or more processors for causing the one or more processors to perform operations. The operations can include generating a graphical user interface depicting a node-link diagram having nodes and links between the nodes. The graphical user interface can include a virtual reference point in the node-link diagram and a virtual control element that is rotatable around the virtual reference point by a user to contact one or more of the nodes in the node-link diagram. The operations can include receiving user input for rotating the virtual control element around the virtual reference point in an amount that generates a contact between the virtual control element and a particular node of the node-link diagram. The operations can include, in response to detecting the contact between the virtual control element and the particular node in the node-link diagram: determining a sound characteristic for a sound configured to indicate an attribute associated with the particular node; and transmitting an audio signal to an audio device. The audio signal can be configured to cause the audio device to generate the sound having the sound characteristic to assist the user in exploring the node-link diagram.

Another example of the present disclosure includes one or more processors and one or more memories storing instructions that are executable by one or more processors for causing the one or more processors to perform operations. The operations can include generating a graphical user interface depicting a node-link diagram having nodes and links between the nodes. The graphical user interface can include a virtual reference point in the node-link diagram and a virtual control element that is rotatable around the virtual reference point by a user to contact one or more of the nodes in the node-link diagram. The operations can include receiving user input for rotating the virtual control element around the virtual reference point in an amount that generates a contact between the virtual control element and a particular node of the node-link diagram. The operations can include, in response to detecting the contact between the virtual control element and the particular node in the node-link diagram: determining a sound characteristic for a sound configured to indicate an attribute associated with the particular node; and transmitting an audio signal to an audio device. The audio signal can be configured to cause the audio device to generate the sound having the sound characteristic to assist the user in exploring the node-link diagram.

Yet another example of the present disclosure includes a computer-implement method. The method can include generating a graphical user interface depicting a node-link diagram having nodes and links between the nodes. The graphical user interface can include a virtual reference point in the node-link diagram and a virtual control element that is rotatable around the virtual reference point by a user to contact one or more of the nodes in the node-link diagram. The method can include receiving user input for rotating the virtual control element around the virtual reference point in an amount that generates a contact between the virtual control element and a particular node of the node-link diagram. The method can include, in response to detecting the contact between the virtual control element and the particular node in the node-link diagram: determining a sound characteristic for a sound configured to indicate an attribute associated with the particular node; and transmitting an audio signal to an audio device. The audio signal can be configured to cause the audio device to generate the sound having the sound characteristic to assist the user in exploring the node-link diagram. Some or all of the method operations can be implemented by one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
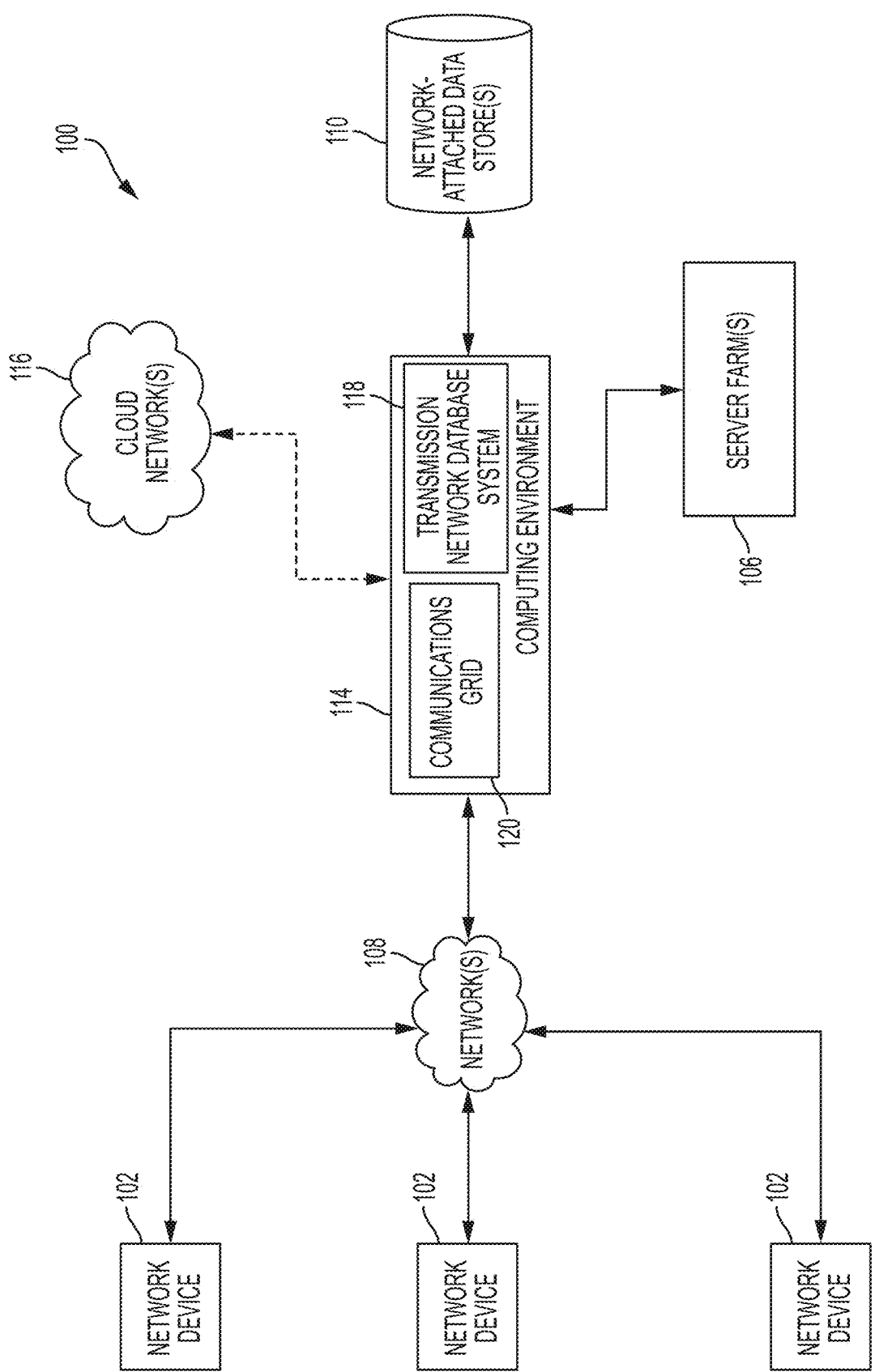
FIG. 1 shows a block diagram of an example of the hardware components of a computing system according to some aspects.

In the appended figures, similar components or features can have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to user interfaces for converting node-link data into audio outputs for aiding visually impaired users. For example, a computing device can receive node-link data defining nodes and links of a node-link diagram. The node-link data may be received as textual data embedded in a file or webpage. The nodes can represent objects (e.g., physical objects, virtual objects, or data items) and the links can represent relationships between the objects. For example, the nodes may correspond to different types of data elements and the links may represent relationships between the different types of data elements. Based on the node-link data, the computing device can generate a user interface. The user interface can include a node-link diagram that visually illustrates the node-link data. The user interface can also include accessibility features that are specially designed to enable a visually impaired user to inspect the node-link diagram using audio feedback. The audio feedback may provide a listener with information about the nodes and links, such as their spatial locations, meanings, and relationships. This type of specialized interface can sometimes be referred to as an "accessible interface" or a "conforming alternate interface," since it transforms visual features and data in ways that make them more accessible to visually impaired users. Through this specialized interface, a visually impaired user may be able to inspect and understand the node-link data in ways that may not otherwise be possible.

In some examples, the user interface can include a virtual reference point in the node-link diagram. The virtual reference point can represent a virtual user position within the node-link diagram. The virtual reference point can be located anywhere in the node-link diagram, though in some examples the virtual reference point begin substantially at a center of the node-link diagram (by default) before being selectively moved to a new location by the user. The user may provide input to move the virtual reference point around the node-link diagram to any suitable location or locations, such as on top of a node or link of the node-link diagram.

The user interface can also include a virtual control element extending outwardly from the virtual reference point. The virtual control element can be usable as a contact element. For example, the virtual control element may be a line protruding outwardly from the virtual reference point toward a boundary of the node-link diagram. The virtual control element may serve as a virtual representation of a cane or another tool used by a visually impaired user to explore real space. The virtual control element can be controlled by the user (e.g., a visually impaired user) of the user interface to inspect the node-link diagram. For example, the virtual control element may be rotated around the virtual reference point until it comes into contact with a node or link of the node-link diagram, at which point the user interface may generate audio feedback indicating one or more characteristics of the contacted node or link.

More specifically, a user may provide input to the computing device for rotating the virtual control element around the virtual reference point, such as in a clockwise or counterclockwise direction. During this rotation, the virtual control element can contact one or more elements (e.g., nodes or links) in the node-link diagram. In response to each contact, the computing device can determine a sonified output associated with the contacted element. A sonified output is a non-speech audio sound, such as a single audio note. As used herein, the phrase "a single audio note" may encompass a tone at a fundamental frequency and any number of its harmonics. Determining the sonified output can involve determining one or more sound characteristics (e.g., a frequency, waveform, magnitude, duration, or pan setting) for the sonified output based on the contacted element. The sonified output can be configured to provide information about the contacted element to the user, such as the type, location, or content of the contacted element. The computing device can then transmit an audio signal to an audio device for causing the audio device to generate the sonified output having the one or more sound characteristics.

In some examples, a sonified output can include two or more sound characteristics that audibly indicate two or more characteristics of a contacted element. For example, if the contacted element is a link that connects two types of nodes together in the node-link diagram, a sonified output may include two different tones that indicate the two different types of nodes that are connected to the ends of the link. Such sonified output audibly provide a user with details about elements of interest, enabling the user to understand the node-link data in ways that may be otherwise difficult or impossible if the user is visually impaired.

The interface features and audio feedback described above can enable a user to quickly and easily interact with a node-link diagram and selectively receive audio feedback that provides corresponding information. This can assist the user in exploring the node-link data, particularly if the user is visually impaired. Such audio feedback may be different from, for example, immersive audio in a video game, in that the audio feedback of the present disclosure is configured to aid with exploring node-link data in a predefined dataset, rather than to simulate virtual interactions in a virtual world of a video game.

As alluded to above, visually impaired users often have trouble interpreting visual content. And different types of visually impaired users may have different needs when it comes to understanding and engaging with visual content. For example, fully blind users may be uninterested in the visual aspects of a node-link diagram, but may wish to understand the underlying relationships represented by the node-link diagram. Low vision users may be interested in the visual aspects of a node-link diagram, but may require the visuals to be large with lots of contrast. Users with small ranges of vision may want the entire node-link diagram to be within their field of view. In some examples, the user interface can be designed or customized to meet the needs of such visually impaired users.

In particular, the user interface can be a compact, high contrast, adjustable visual that can be customized to meet the needs of a visually impaired user. A user can adjust the visual settings of the user interface to customize one or more visual aspects of the user interface, such as contrasts, fonts, colors (e.g., font color, background color, and foreground color), sizes, and shapes associated with elements of the user interface. In one particular example, a user may customize the user interface to depict the node-link diagram with high-contrast colors, which may enable the user to readily identify the nodes and links in the diagram. The user may also customize the user interface to depict the virtual control element with a specific color or contrast level, to enable the user to readily identify the control element. Such visual customizations can improve perception of the node-link diagram for a visually impaired user.

Audio settings of the user interface may also be customizable. For example, the user may be able to turn on or off sonification (e.g., the use of non-speech audio to convey information or perceptualize data). The user may also be able to customize which types of information are audibly output via sonification. For example, the user may be able to select whether node information, link information, or both are expressed via sonification. Audio settings for other types of audio output may also be user customizable.

One example of another type of audio output can be speech output. The user interface can provide speech outputs additionally or alternatively to sonified outputs. For example, the computing device may detect a user interaction with a node in the node-link diagram and responsively implement sonification by outputting an audio note with a particular pan and pitch configured to indicate a particular characteristic of the node. The computing device may also provide speech output associated with the node to supplement the sonified output, for example, by describing the particular characteristic using speech (e.g., with words). Such speech output may be turned on or off by the user as desired. For example, a user may turn off sonification and turn on speech output if the user wants to quickly obtain exact data-values without the sonification interfering, and the user may turn on sonification and turn off speech output if the user wants to listen to the audio notes without the speech output interfering.

In some examples, the user interface may provide for multiple speech-output settings. Examples of speech-output settings can be a terse setting and a verbose setting. In the terse setting, only a limited set of attributes (e.g., numerical values) may be output for a contacted element in the node-link diagram. In the verbose setting, additional attributes (e.g., a label, name, bearing, distance, dimension, color, or type) associated with the contacted element may be output. A user may be able to select among the speech-output settings as desired. The different types of speech-output settings may allow the user to more granularly control the amount and types of information received via audio feedback.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for generating user interfaces for converting node-link data into sonified output according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network.

Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and convert the data into sonified output.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for generating user interfaces usable in converting node-link data into sonified output.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for generating user interfaces usable in converting node-link data into sonified output. For example, the computing environment 114, a network device 102, or both can implement one or more versions of the processes discussed with respect to any of the figures.

Figure 2:
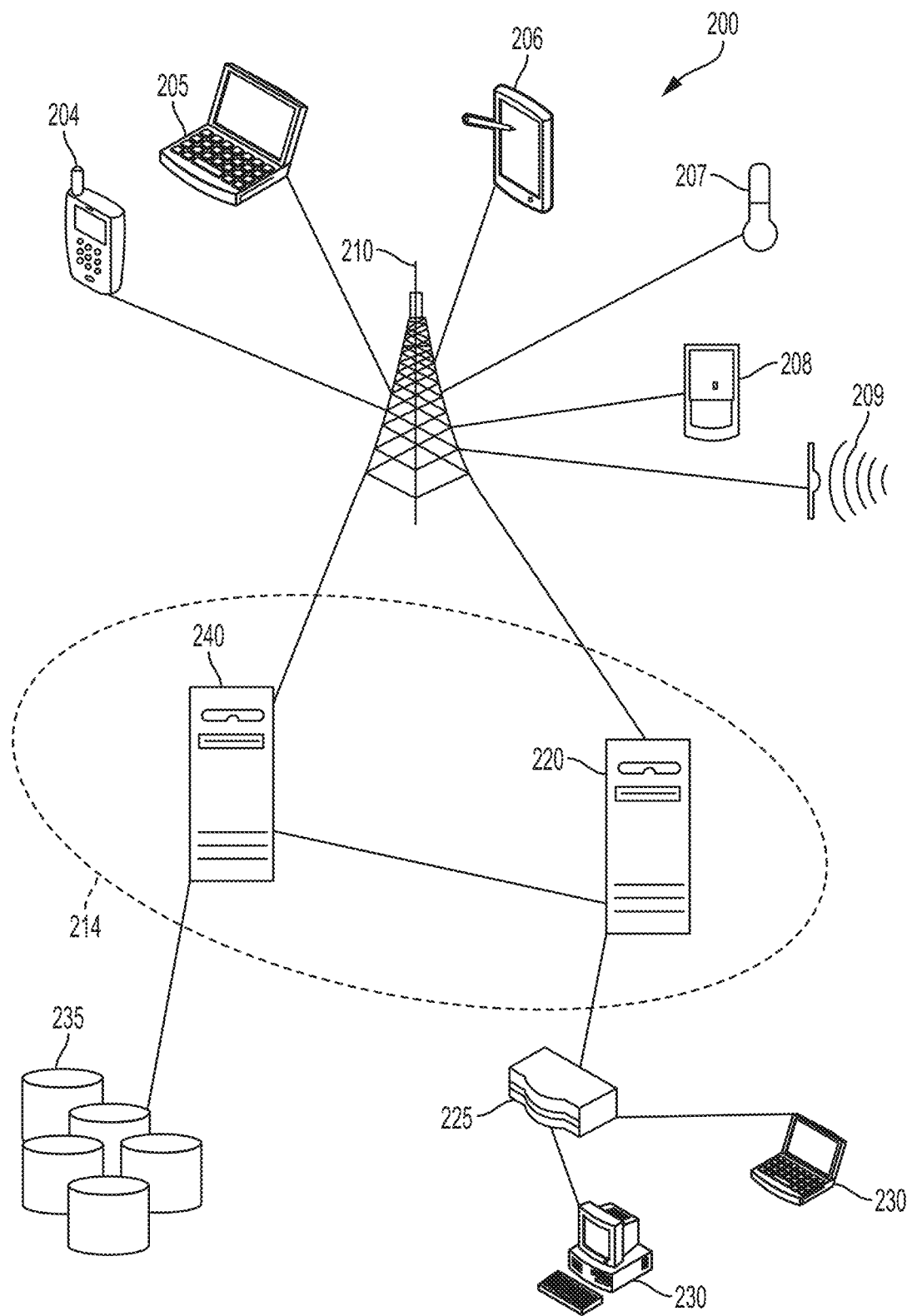
FIG. 2 shows an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., for incorporation into a user interface).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, node-link data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for generating user interfaces usable in converting node-link data into sonified output, the computing environment 214 can perform a pre-analysis of the node-link data. The pre-analysis can include determining whether the node-link data is in a correct format and, if not, reformatting the node-link data into the correct format.

Figure 3:
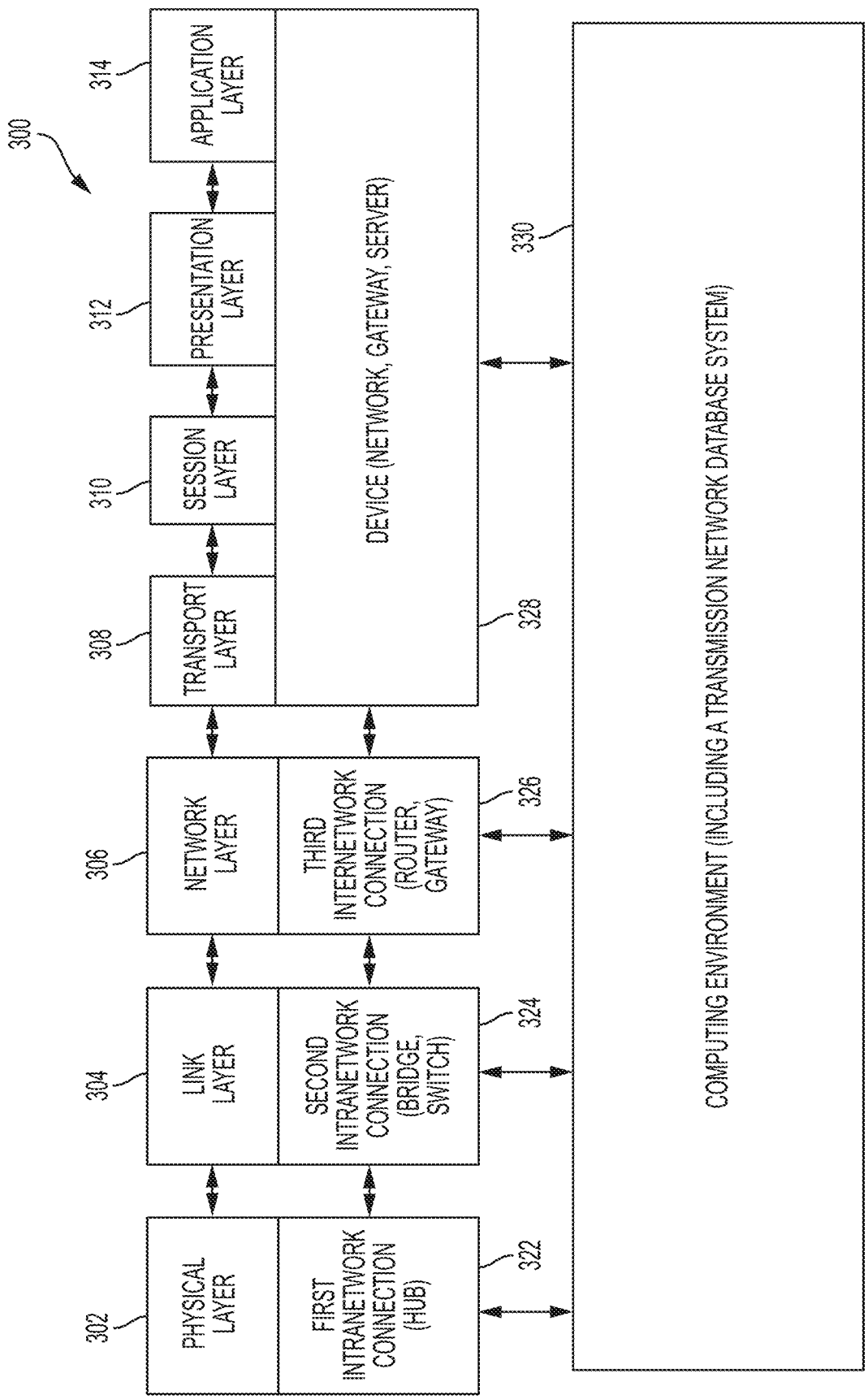
FIG. 3 shows a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for converting node-link data into sonified output, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for generating user interfaces and/or converting node-link data into sonified output.

Figure 4:
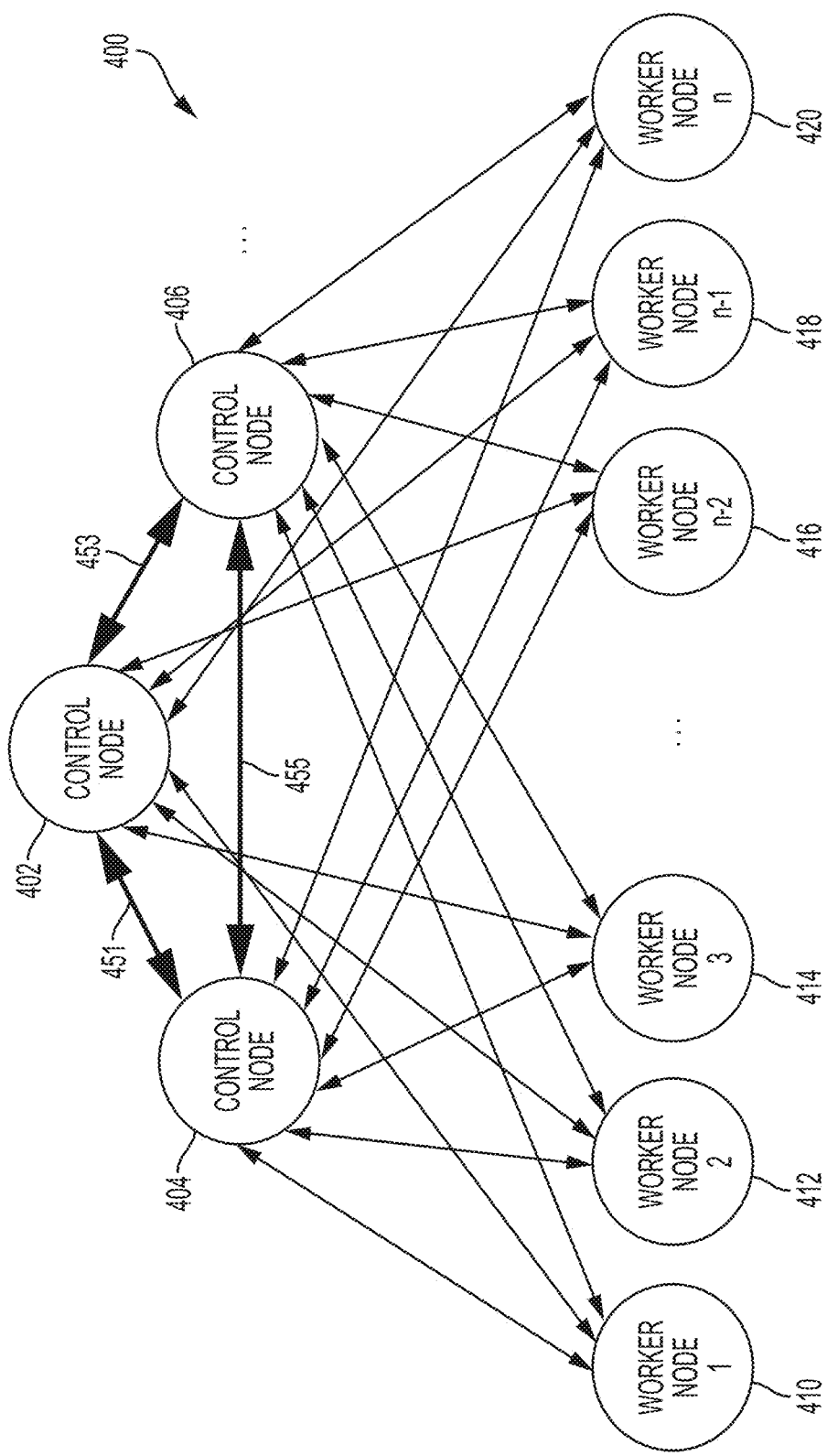
FIG. 4 shows a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to for generating user interfaces. The project may include the data set. The data set may be of any size and can include node-link data. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for generating a user interface for converting node-link data into sonified output can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may generate a sonified output using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used for generating user interfaces and converting node-link data into sonified output.

Figure 5:
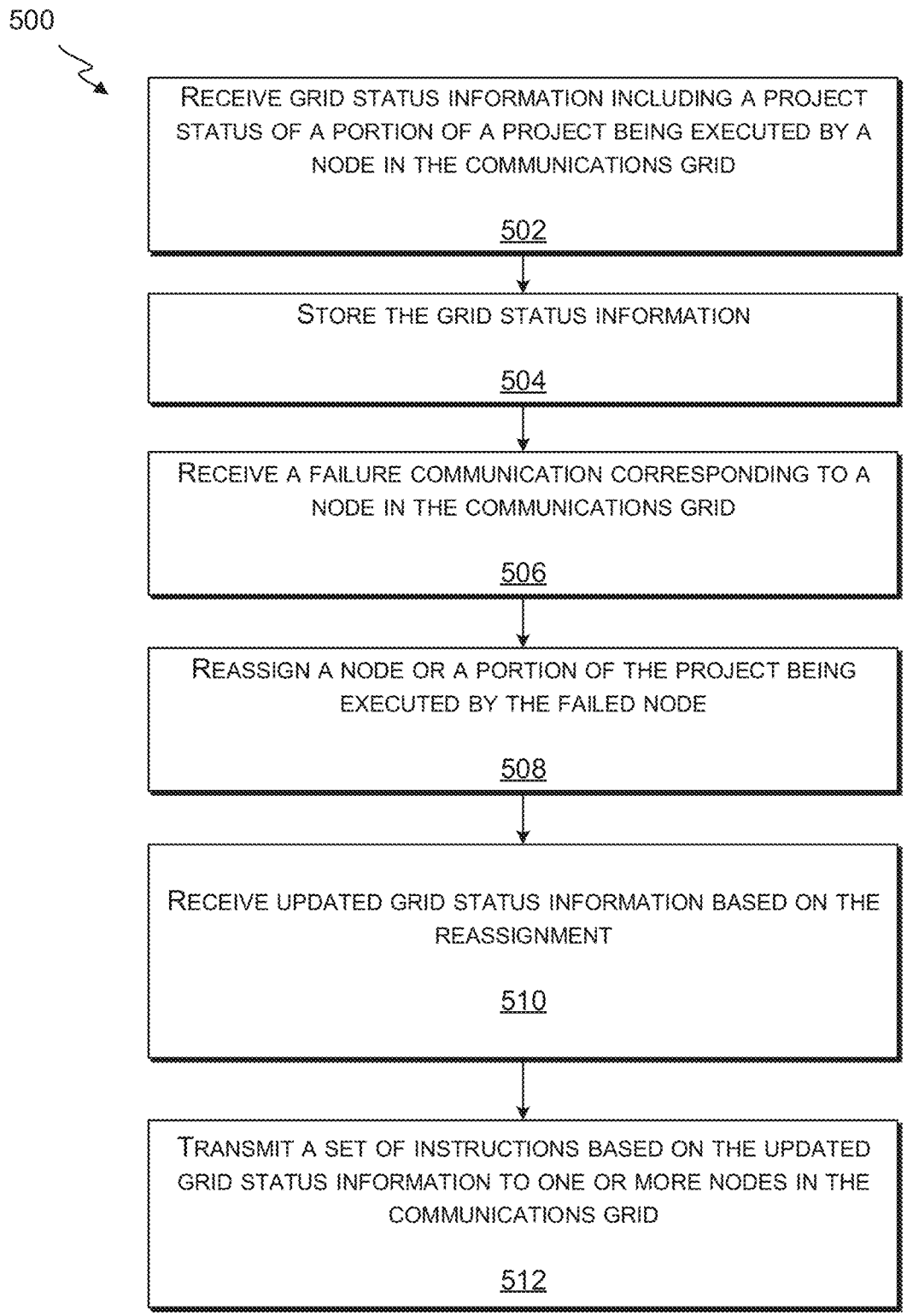
FIG. 5 shows a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
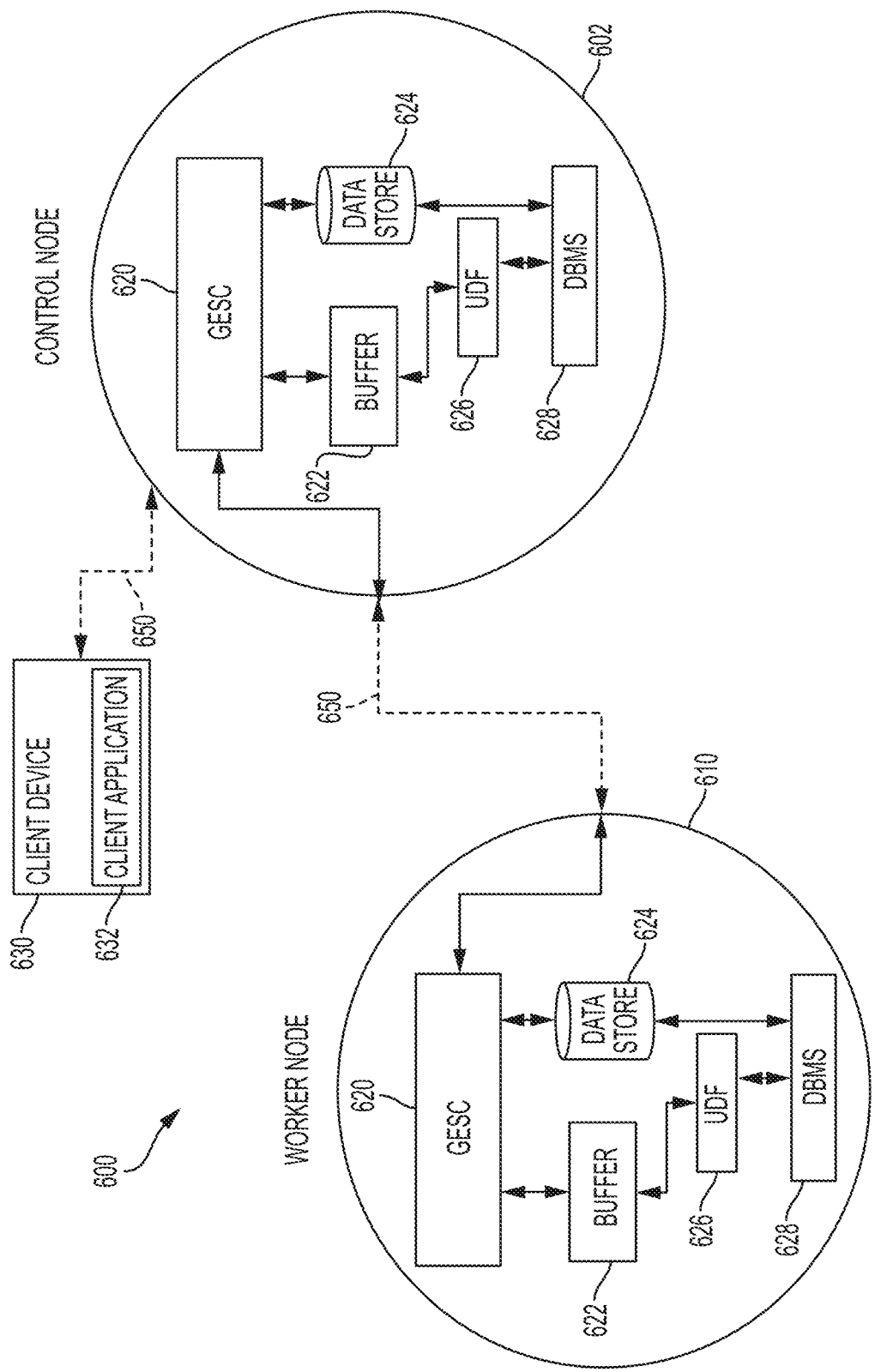
FIG. 6 shows a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors.

Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
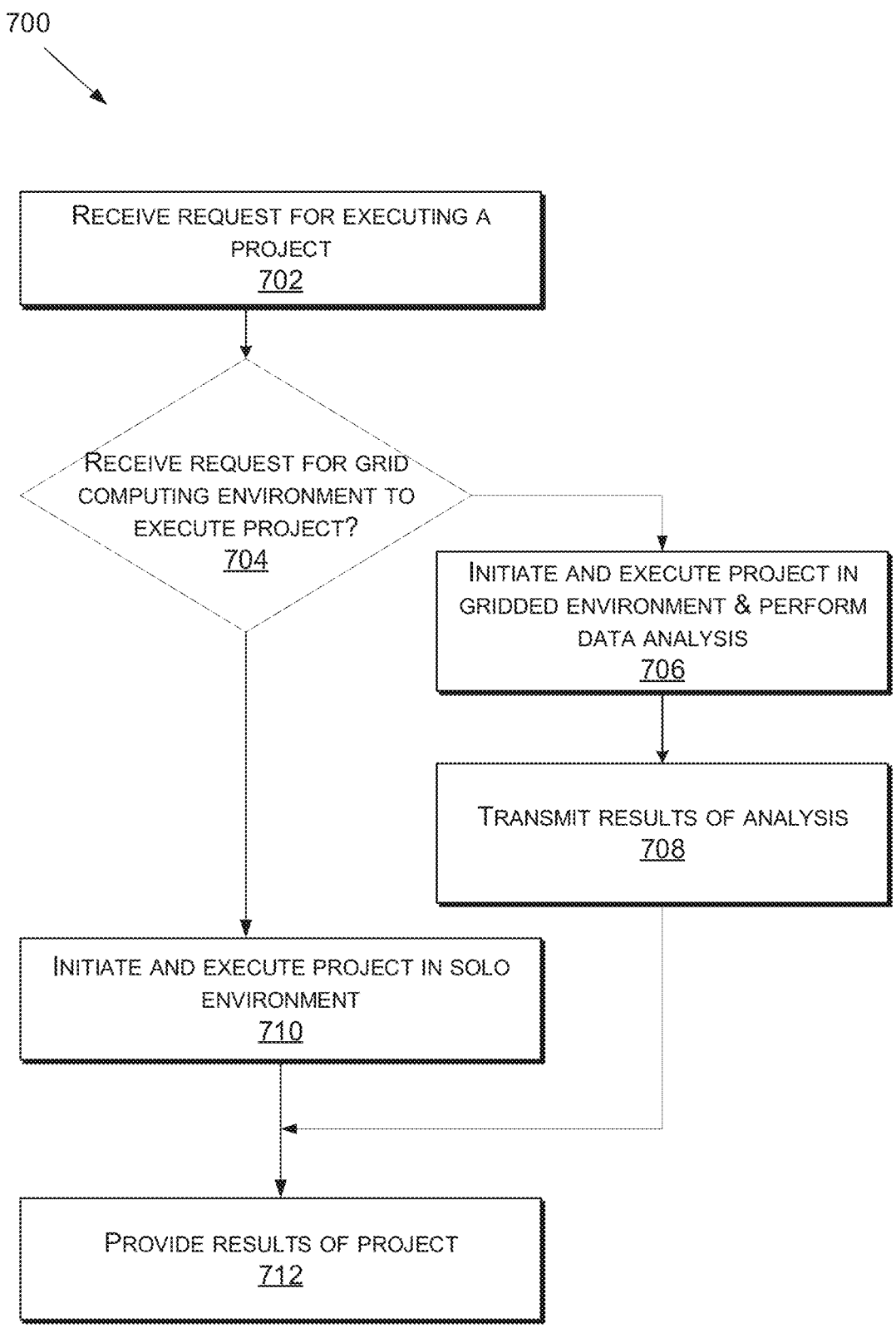
FIG. 7 shows a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
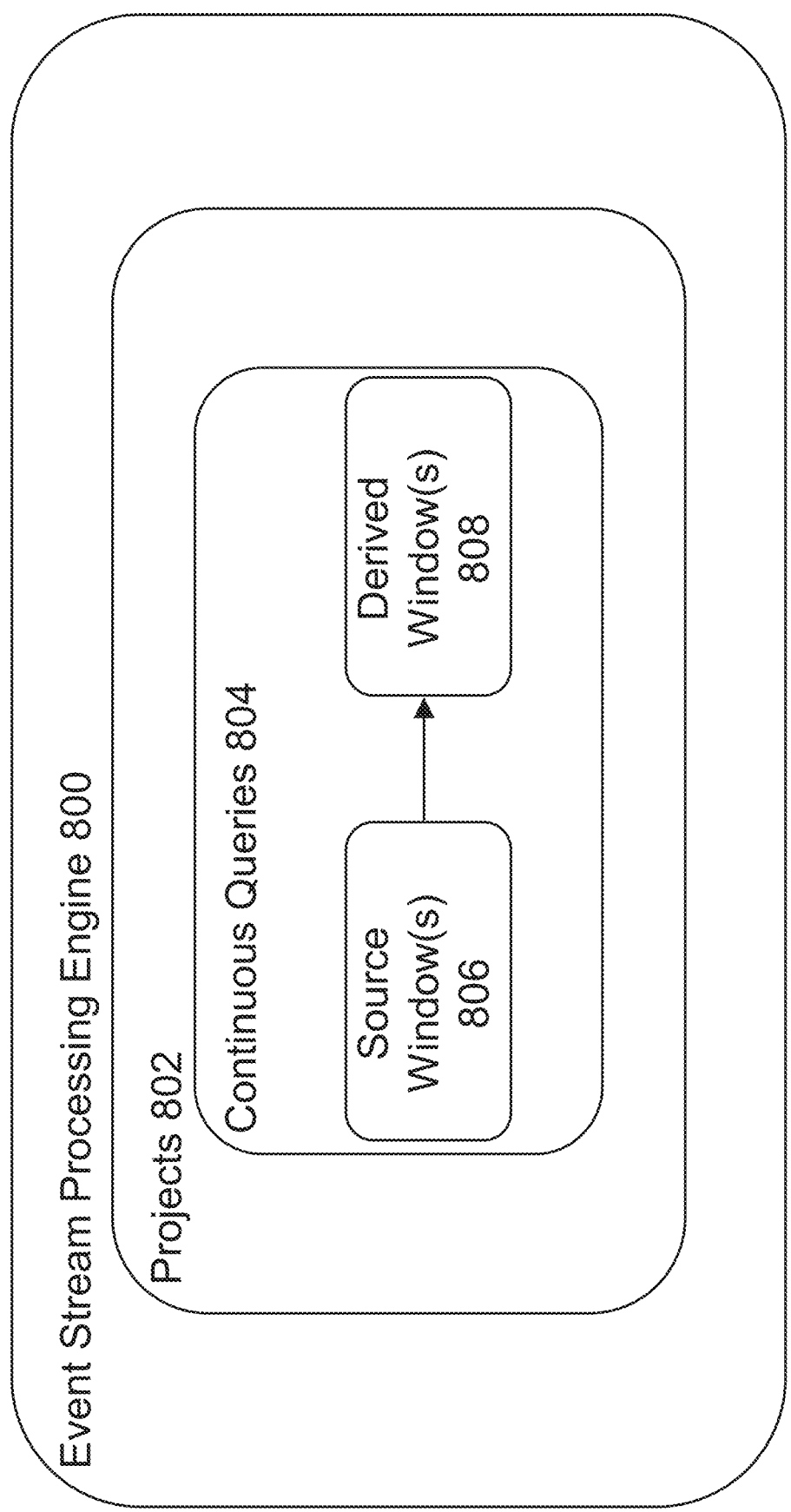
FIG. 8 shows a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
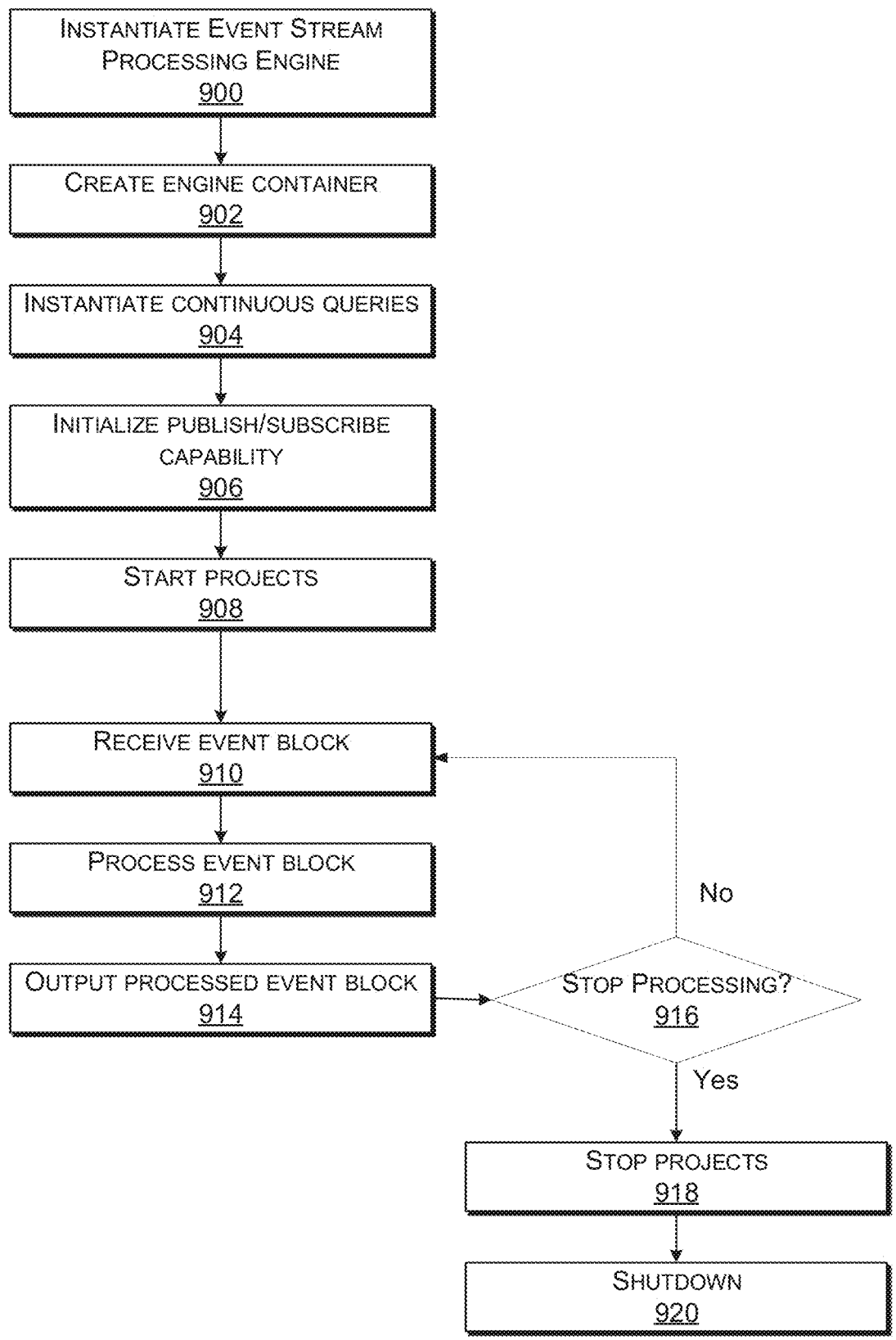
FIG. 9 shows a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
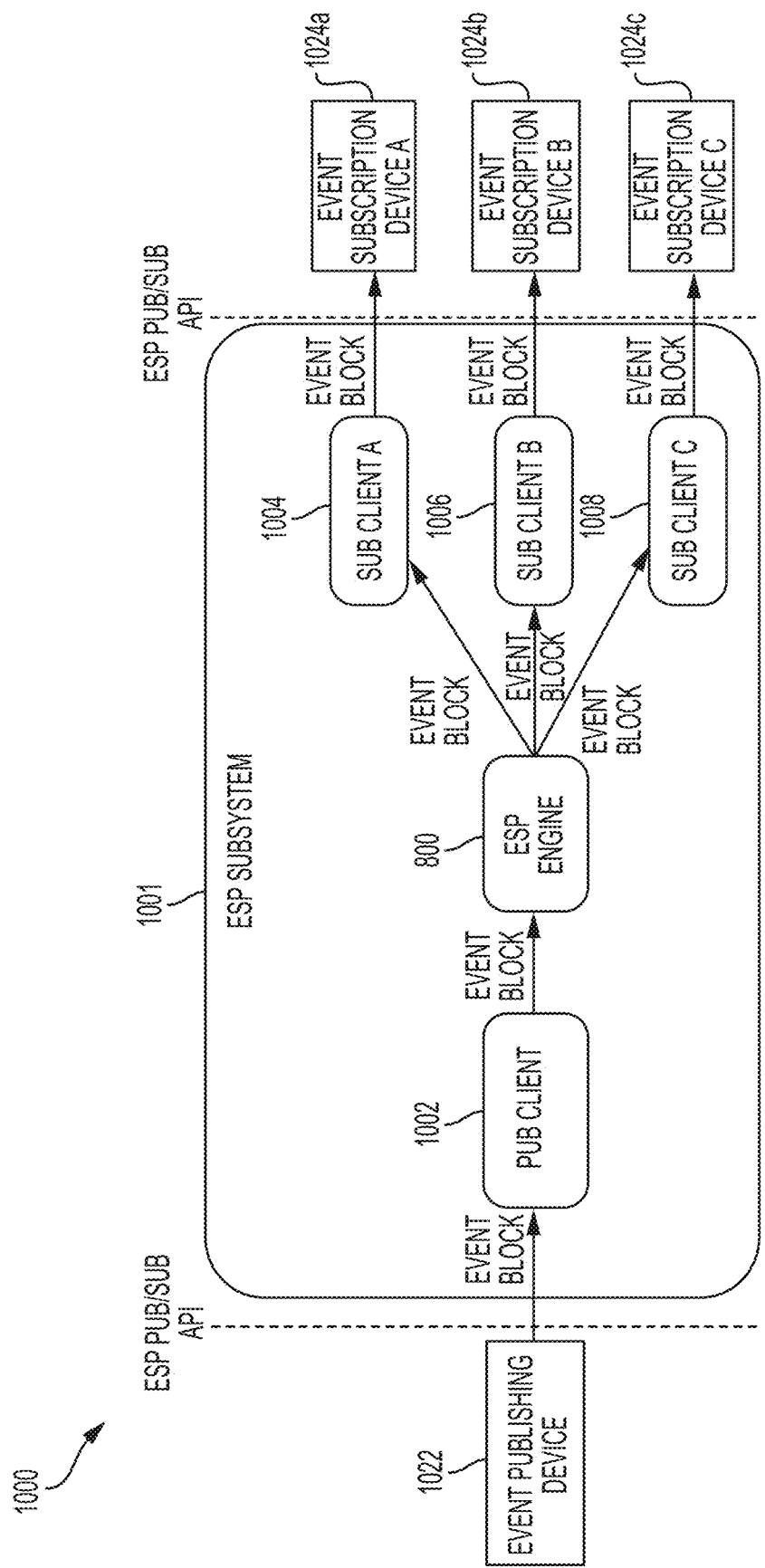
FIG. 10 shows a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
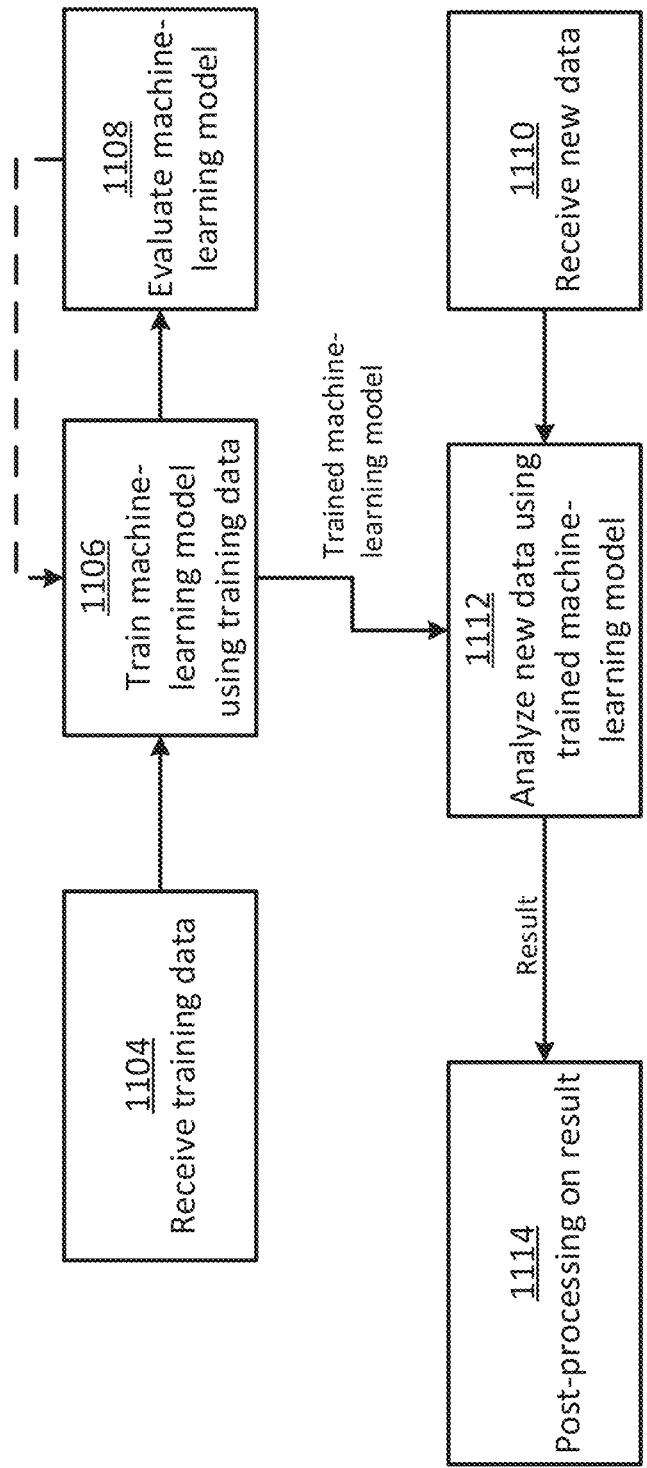
FIG. 11 shows a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering: fraud detection; customer segmentation; generating online recommendations; adaptive websites; determining customer lifetime value; search engines; placing advertisements in real time or near real time; classifying DNA sequences; affective computing; performing natural language processing and understanding: object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format into a second format. Any number and combination of operations can be performed on the result during post-processing.

Figure 12:
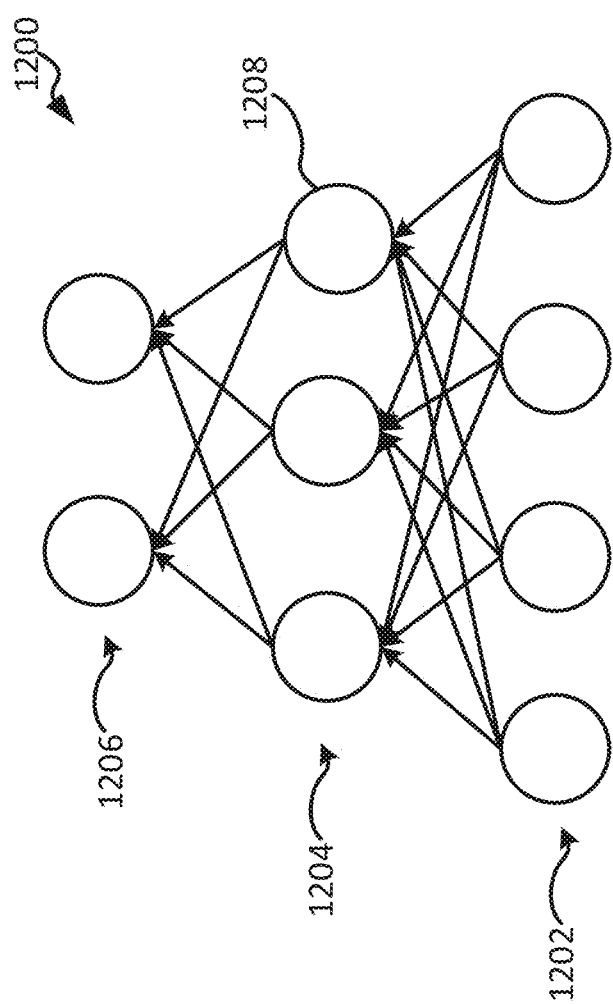
FIG. 12 shows a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
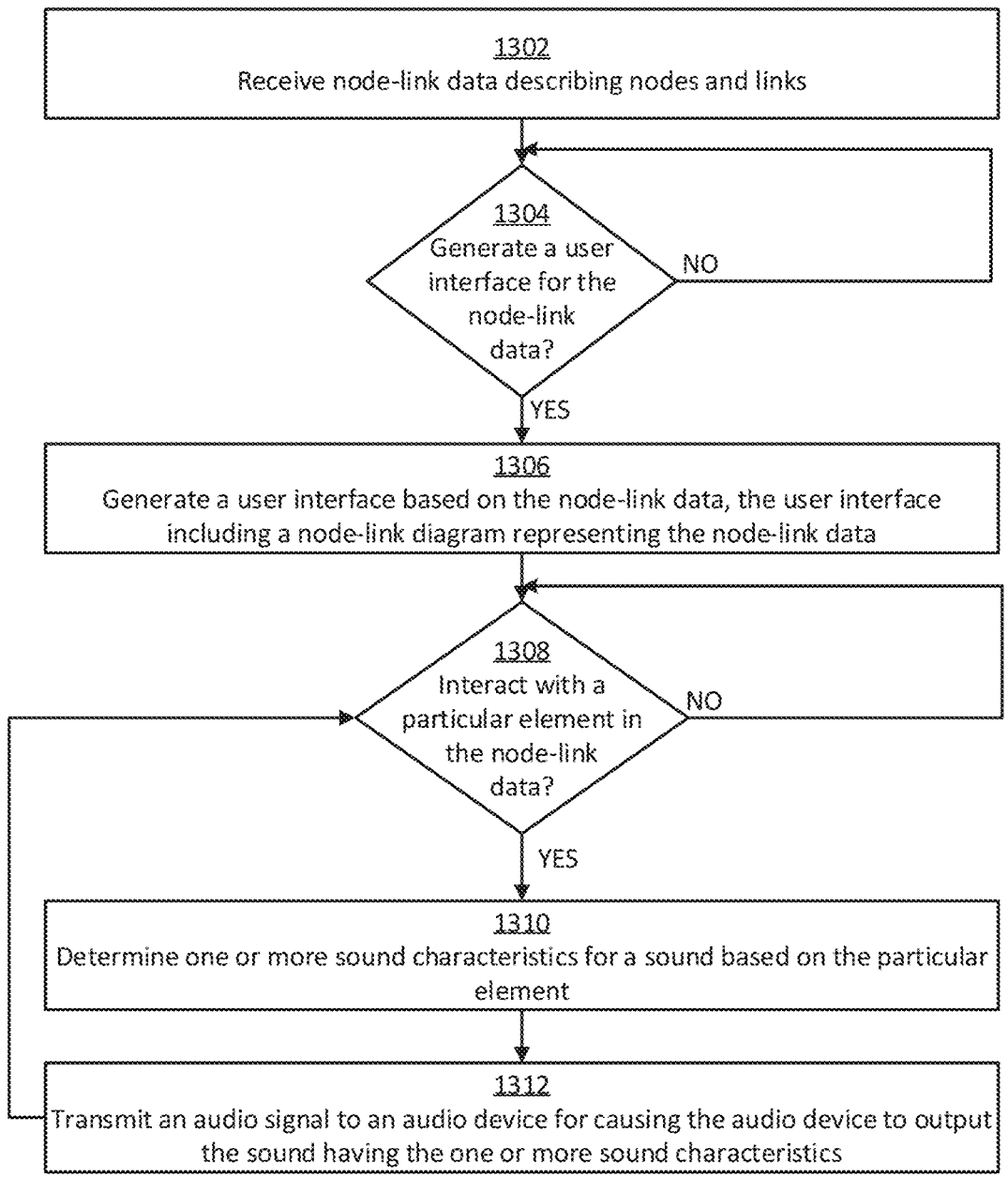
FIG. 13 shows a flow chart of an example of a process for converting node-link data into audio outputs according to some aspects.

FIG. 13 is a flow chart of an example of a process for converting node-link data into a sonified output according to some aspects. Some examples can include more operations, fewer operations, different operations, or a different order of operations than is depicted in FIG. 13.

In block 1302, a processing device receives node-link data. The processing device can receive the node-link data from any suitable location. For example, the processing device can receive the node-link data from a remote datastore or from a website visited using a website browser. The node-link data may be received in any suitable form, such as a textual format or an image format.

The node-link data can describe nodes and links. The nodes may represent objects (e.g., physical objects or virtual objects) and the links may represent relationships between the objects. Examples of the objects may be buildings such as homes or warehouses: animals such as birds or sharks; vehicles such as cars, planes, or boats; humans; plants such as trees or bushes; water bodies such as lakes, streams, and oceans; or any combination of these. Other examples of the objects can include different types of data elements, such as phone numbers, names, addresses, geographical locations, license plate numbers, social security numbers, device identifiers, transactions, passwords, names, biometric data, medical data, or any combination of these.

In some examples, the links can represent the objects and the nodes may represent relationships between the objects. For example, the links may represent roads and the nodes may represent intersections between the nodes. Of course, this may also be considered as the nodes representing objects (the intersections) and the links representing relationships between the objects (connections between the intersections).

In block 1304, the processing device determines if a user interface (e.g., an accessible interface) is to be generated for the node-link data. For example, the processing device can be configured to automatically generate the user interface in response to receiving the node-link data. In another example, the processing device can determine that an user interface is to be generated for the node-link data in response to a user input, such as an interaction with a button in a webpage or a software application, as described in greater detail below with respect to FIG. 14.

Figure 14:
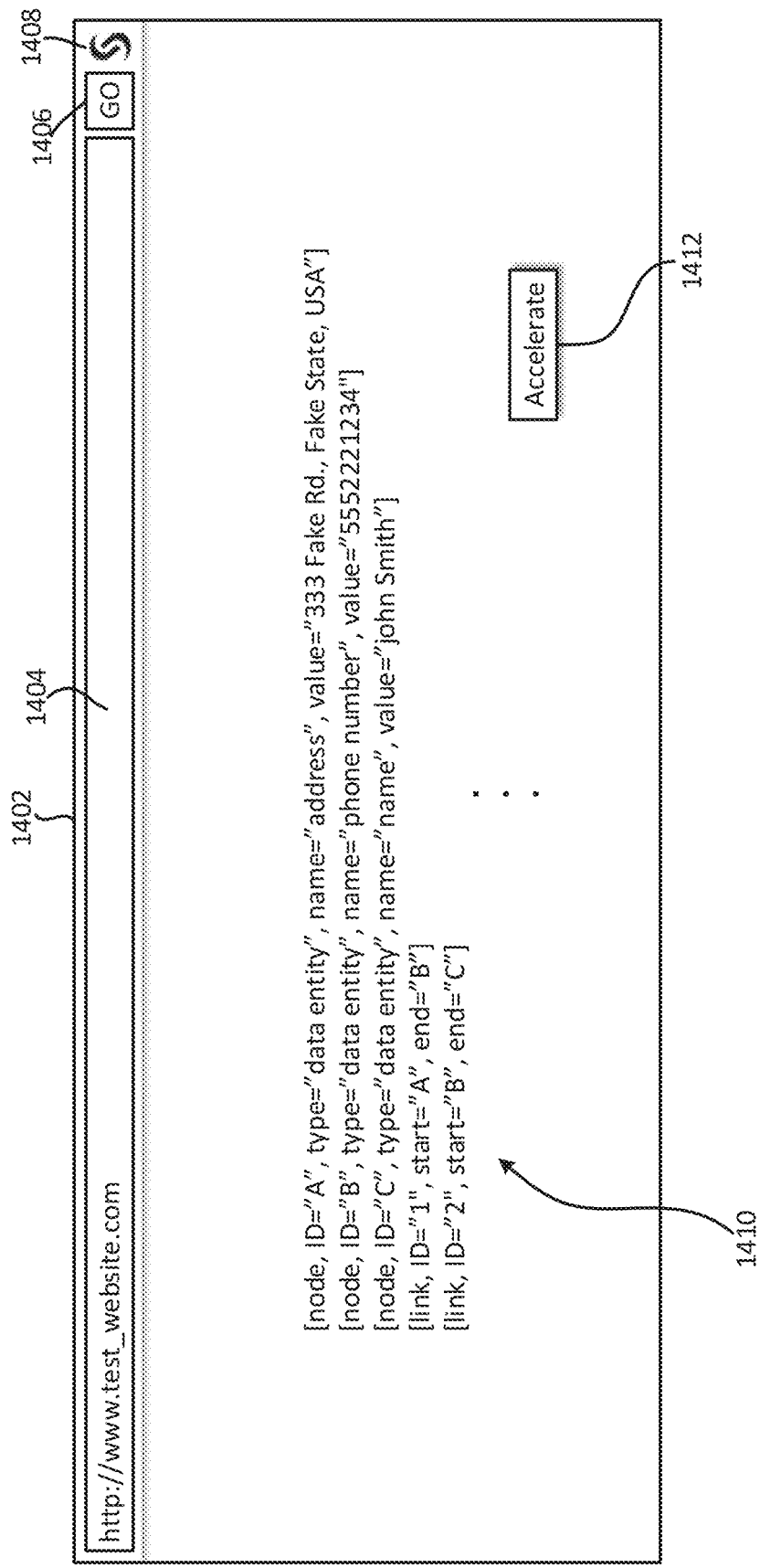
FIG. 14 shows an example of node-link data within a website browser according to some aspects.

As shown in FIG. 14, the node-link data 1410 can be provided as part of a webpage in a website browser 1402. The node-link data 1410 may be visible in the webpage or hidden from view, for example if the node-link data1410 is incorporated into the underlying code (e.g., HTML code or Javascript) for the webpage. In this example, the node-link data 1410 is in textual form and includes various attributes of nodes and links of the node-link diagram, but the node-link data 1410 may be provided in other formats and contain other attributes in other examples.

To navigate to the website, a user may input a uniform resource location (URL) for the website into an address bar 1404 of the website browser 1402 and press a navigation button 1406. Upon navigating to the website, a browser plugin or extension 1408 that has been incorporated into the website browser 1402 may be used to generate a user interface based on the node-link data 1410. The browser plugin or extension 1408 may be data-analysis software that is specifically configured for enabling visually impaired users to explore node-link datasets using audio feedback.

In some examples, the browser plugin or extension 1408 can detect the presence of the node-link data 1410 and, in response, automatically incorporate a button 1412 into the content of the website. The button 1412 can be incorporated into the content of the website by including a code snippet associated with the button 1412 into the underlying code for the website. Alternatively, the browser plugin or extension 1408 may provide the button 1412 to the user through a menu or another user interface component. Regardless of how it is provided, the button 1412 can be selected by the user for causing the processing device to generate a user interface for the node-link data 1410. The processing device can detect such a user interaction with the button 1412 and responsively determine that the user interface is to be generated. The processing device may then use the browser plugin or extension 1408 to generate the user interface for the node-link data 1410. For example, the processing device can execute program code of the browser plugin or extension 1408 to generate the user interface and incorporate the user interface into the webpage in the website browser 1402. This may be achieved by including code snippet associated with the user interface into the underlying code for the website. Alternatively, the processing device can execute program code of the browser plugin or extension 1408 to generate the user interface outside of the webpage or the website browser 1402.

While the above example involves a browser plugin or extension 1408, other examples may use other approaches to provide the user interface. For example, the user interface may be built into the website browser and selectively activated by the user. As another example, the user interface may be provided in a native application that is executable on a computing device and different from a website browser. As yet another example, the user interface may be provided natively as part of a website or web application and selectively activated by the user. The user may select whether to initiate the user interface by setting a browser setting, selecting an option within the native application, selecting website or web application, etc.

In some examples, the processing device may execute a software application that is separate from the website browser 1402 and capable of interacting with the website browser 1402. The software application can be data-analysis software that is specifically configured for enabling visually impaired users to explore node-link datasets using audio feedback. The software application can detect the presence of the node-link data 1410 in the webpage and, in response, automatically interact with the website browser 1402 to incorporate a button 1412 into the content of the website. The button 1412 can be incorporated into the content of the website by including a code snippet associated with the button 1412 into the underlying code for the website. Alternatively, the software application may provide the button 1412 to the user through a menu or another user interface component. Regardless of how it is provided, the button 1412 can be selected by the user for causing the processing device to generate a user interface for the node-link data 1410, which may or may not be included in the website or the website browser 1402.

Referring back to FIG. 13, if the processing device determines that a user interface is to be generated for the node-link data, the process can continue to block 1306. Otherwise, the process can await a user input indicating that the user interface is to be generated.

In block 1306, the processing device generates a user interface based on the node-link data. The user interface can include a node-link diagram that visually depicts nodes and links. In some examples, the nodes can be spatially positioned at locations in the node-link data based on their attributes. For example, if the nodes represent buildings in a particular environment (e.g., the real world or a virtual world), the nodes may be spatially positioned in the node-link diagram based on their coordinates in that environment. As a result, the spatial positioning of the nodes in the node-link diagram can reflect the relative locations of the buildings in that particular environment. Alternatively, the nodes may be positioned in the node-link diagram independently of their attributes, for example by applying a best-fit algorithm. As a result, the spatial locations of the nodes in the node-link diagram may not be chosen to convey any particular meaning about the attributes of the nodes.

Figure 15:
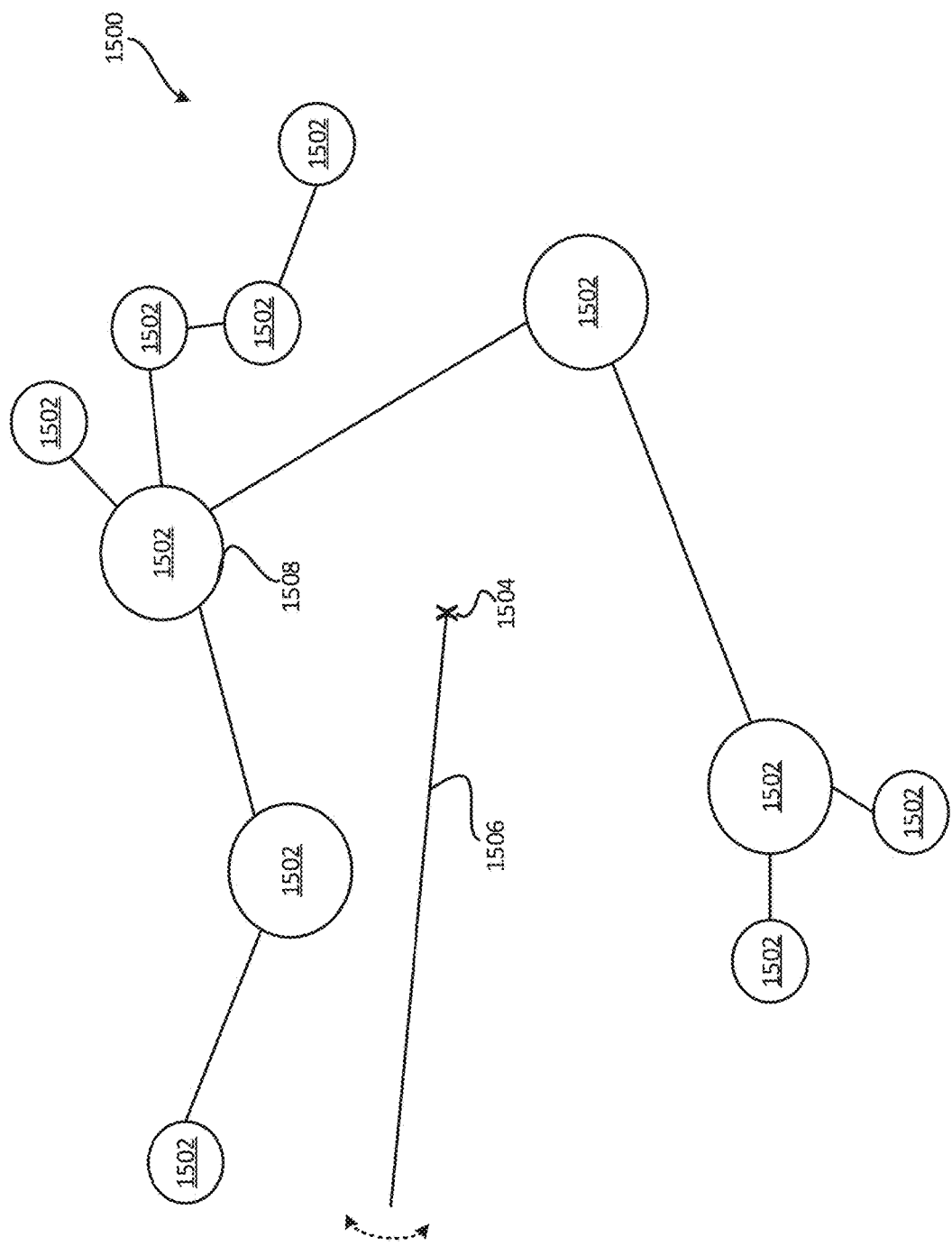
FIG. 15 shows an example of a node-link diagram according to some aspects.

One example of the node-link diagram is shown in FIG. 15. As shown, the node-link diagram 1500 can include nodes 1502 and links that connect the nodes together. The nodes 1502 and links may be spatially organized in the node-link diagram 1500 in any suitable manner. In some examples, the nodes 1502 and links may be spatially organized in the node-link diagram 1500 based on their values. In other examples, the nodes 1502 and links may be spatially organized in the node-link diagram 1500 independently of the nodes' values. For example, the nodes 1502 may be organized using a force directed layout (FDL) scheme that can organize the nodes in an aesthetically pleasing way, rather than based on the node's values.

In some examples, the nodes 1502 may all have the same visual characteristics (e.g., sizes, shapes, icons, or colors) or may have different visual characteristics to one another. The visual characteristics of a node may indicate an attribute of the node. For example, larger nodes may have more links associated therewith than smaller nodes. As another example, circular nodes may be used to represent one type of object and triangular nodes may be used to represent another type of object. The nodes 1502 can be assigned any suitable size and shape to convey information as desired.

The visual properties of the nodes 1502 and links can indicate the salient characteristics of the nodes and links, respectively. For example, the color, shape, location, and/or icon associated with a node may convey the most salient characteristics of the node. As another example, the color, size (e.g., thickness or length), directionality, and/or icon associated with a link may convey the most salient characteristics of the link. While these visual properties may be readily viewed and understood by sighted users, visually impaired users may be unable to do the same. So, in some examples the salient characteristics of the nodes and links may be auditory conveyed via speech output and sonified output to assist a visually impaired user in understanding the node-link diagram.

The node-link diagram 1500 can also include a virtual reference point 1504 that may designate a virtual user position in the node-link diagram 1500. The virtual reference point 1504 is represented in FIG. 15 by the X located substantially at the center of the node-link diagram 1500. The nodes and links may be scattered in 360 degrees around the virtual reference point.

In some examples, the virtual reference point 1504 is movable. For instance, a user can provide input via a user input device to move the virtual reference point north, south, east, and/or west inside the node-link diagram 1500. The node-link diagram 1500 may also pan based on the movement of the virtual reference point 1504, for example to center the virtual reference point 1504 within the node-link diagram 1500. As another example, a user can select an element (e.g., a node or link) in the node-link diagram 1500. In response to this selection, the processing device can cause the virtual reference point 1504 to "jump" to that element, such that the virtual reference point 1504 is spatially positioned on top of that element. That element may then become the focal point of the node-link diagram 1500. For example, the user may choose to position the virtual reference point 1504 on top of node 1508. In response to the virtual reference point 1504 moving to node 1508, the node-link diagram 1500 may also automatically pan, for example to center the virtual reference point 1504 within the node-link diagram 1500.

The node-link diagram 1500 can further include a virtual control element 1506. In the example shown in FIG. 15, the virtual control element 1506 is a line extending between the virtual reference point 1504 and the outer boundary of the node-link diagram 1500. But in other examples, the virtual control element 1506 may have other shapes or locations in the node-link diagram 1500. In some examples, the virtual control element 1506 can represent a cane or another device that a visually impaired user can manipulate to explore real space. A user may be able to interact with the user interface to move the virtual control element 1506 within the node-link diagram 1500. For example, a user can provide user input to the user interface for rotating the virtual control element 1506 around the virtual reference point 1504. The user can rotate the virtual control element 1506 in a clockwise or counterclockwise direction, as indicated by the dashed double-headed arrow in FIG. 15. In some examples, the rotation of the virtual control element 1506 may be a smooth and relatively continuous rotation around the virtual reference point 1504. In other examples, the rotation may be discontinuous such that the virtual control element 1506 jumps between elements in the node-link diagram 1500. In one such example, the virtual control element 1506 may jump from a first node to a second node, without contacting an intervening region of the node-link diagram 1500 that is between the first and second node.

As the virtual control element 1506 moves in the node-link diagram 1500, the virtual control element 1506 may interact with (e.g., jump to or overlap with) a node or link in the node-link diagram 1500. In response to detecting such an interaction, the user interface may generate one or more audio outputs configured to provide information to the user about the node or link. This is described in greater detail later on.

In some examples, the user can provide input to the user interface to change a length of the virtual control element 1506. For example, the user can extend the length of the virtual control element 1506 so that it can cover a greater radial distance in the node-link diagram 1500. As a result, the virtual control element 1506 can contact node and links that are farther away from the virtual reference point 1504 in the node-link diagram 1500 than if the virtual control element 1506 was shorter. Alternatively, the user may shorten the length of the virtual control element 1506 so that it can cover a smaller radial distance in the node-link diagram 1500. As a result, the virtual control element 1506 may only contact nodes and links that are closer to the virtual reference point 1504 in the node-link diagram 1500, which may allow the user to focus on closer objects.

Depending on the length and position of the virtual control element 1506, the virtual control element 1506 may interact with multiple elements (e.g., nodes and links) simultaneously. For example, the virtual control element 1506 can contact two or more nodes at the same time, two or more links at the same times, or a node and a link at the same time. In some such examples, the processing device can determine which of the contacted elements is closest to the virtual reference point 1504 and generate one or more one or more audio outputs configured to provide information to the user only about that one contacted element. Alternatively, the processing device can generate one or more one or more audio outputs configured to provide information to the user about some or all of the contacted elements.

It will be appreciated that the node-link diagram 1500 depicted in FIG. 15 is intended to be conceptual in nature and that the node-link diagram 1500 may be defined in one or more data structures stored in memory. As a result, the node-link diagram 1500 may be a non-visual diagram that is not actually displayed on a display device, in some examples. Alternatively, node-link diagram 1500 can be displayed on a display device as part of a graphical portion of an user interface, an example of which is described in greater detail later on.

Returning to FIG. 13, at block 1308, the processing device determines if a user input has been received for interacting with a particular element (e.g., a node or link) in the node-link diagram. Such a user input can be received from a user input device, such as the gamepad described above. If the processing device has received such user input, the process can continue to block 1310. Otherwise, the process can await such user input.

In block 1310, the processing device determines one or more sound characteristics for a sound based on the particular element. Examples of the one or more sound characteristics can include a frequency, a magnitude, a duration, a waveform, a pan setting, or a word or phrase. The sound can include a sonified output, a speech output, or both.

The processing device can determine the one or more sound characteristics based on one or more attributes associated with the particular element. For example, the processing device can determine the one or more sound characteristics based on a type, color, size, icon, value, label, direction (e.g., angle relative to a reference line), or location associated with the element in the node-link diagram. In one such example, the processing device can pan the sound more toward a left speaker or a right speaker of an audio device based on how far left or how far right, respectively, the particular element is relative to the virtual reference point in the node-link diagram. Additionally or alternatively, the processing device can determine a frequency of the sound based on a value of the element. For instance, the processing device can determine the frequency of the sound based on a proportional relationship to the value, such that lower values result in lower frequencies and higher values result in higher frequencies. By determining the pan setting and frequency for the sound as described above, the sound can indicate a variety of information about the element to a user. Of course, the processing device may also use other schemes to provide relevant information to the user.

As another example, the processing device can determine a duration of the sound based on the value of the element. For instance, the processing device can determine the duration based on a proportional relationship with the value, such that higher values result in longer durations and smaller values result in shorter durations. As another example, the processing device can configure the one or more sound characteristics to indicate coordinates of a physical or virtual object associated with the particular element. As yet another example, the processing device can configure the one or more sound characteristics to indicate a label assigned to the particular element. The processing device can configure any number and combination of sound characteristics to indicate any number and combination of attributes associated with the particular element to the user.

In block 1312, the processing device transmits an audio signal to an audio device (e.g., one or more loudspeakers) for causing the audio device to generate the sound having the one or more sound characteristics. The processing device can generate the audio signal based on the one or more sound characteristics. The sound may assist the user in exploring the node-link data. The process can then return to block 1308, at which point the processing device can await further user inputs.

Figure 16:
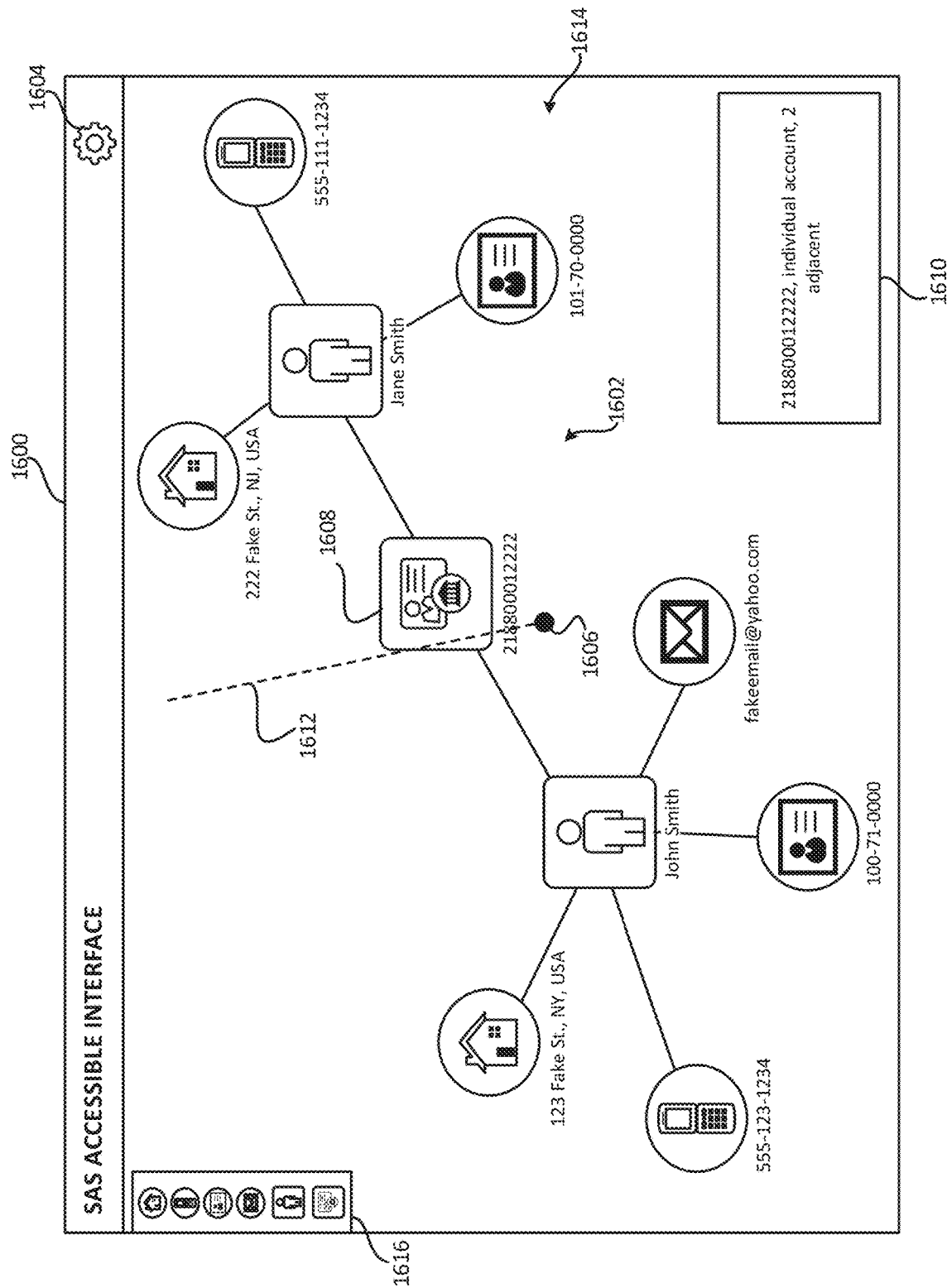
FIG. 16 shows an example of a user interface according to some aspects.

FIG. 16 shows an example of a user interface 1600 according to some aspects. The user interface 1600 can be a graphical user interface that is displayed on a display device, for instance as part of a webpage in a website browser. Examples of the display device can include a liquid crystal display (LCD) or a light emitting diode (LED) display, which may form at least part of a computer monitor, a television, etc. The processing device can transmit display signals to the display device for causing the display device to output the user interface 1600.

In some examples, the user interface 1600 can include a node-link diagram 1602. The node-link diagram 1602 may be designed to assist visually impaired users with exploring node-link datasets and other types of datasets. For example, the node-link diagram 1602 may have nodes and links in high-contrast colors selected to aid visually impaired users.

It will be appreciated that although the node-link diagram 1602 is depicted in the user interface 1600 in FIG. 16, in other examples the user interface 1600 may exclude the node-link diagram 1602. A user may be able to select whether or not the node-link diagram 1602 is to be visually displayed in the user interface 1600 through a settings interface via a settings button 1604. Excluding the node-link diagram 1602 from the user interface 1600 can improve processing time and may be preferable in certain situations, such as if the user is fully visually impaired and therefore unable to view the user interface 1600.

Within the node-link diagram 1602 can be a virtual control element 1612 for interacting with elements of the node-link diagram 1602, such as node 1608. In the example shown in FIG. 16, the virtual control element 1612 is a line extending outwardly from a virtual reference point 1606 toward an outer boundary of the node-link diagram 1602. But the virtual control element 1612 can have other shapes and configurations in other examples. A user can provide user input (e.g., via a user input device) to the processing device to manipulate the virtual control element 1612, and thereby cause the virtual control element 1612 to interact with elements of the node-link diagram 1602. In response to detecting such interactions, the processing device may generate one or more audio outputs configured to provide information to the user about the contacted elements. In the example shown in FIG. 16, the virtual control element 1612 is in contact with a node 1608, so the processing device may generate one or more audio outputs related to node 1608.

In some examples, the audio outputs can include sonified outputs and speech outputs. A sonified output can be one or more audio notes configured to provide information about an element in the node-link diagram 1602. For example, a sonified output can indicate a type of the node 1608. Additionally or alternatively, the sonified output can indicate a label, bearing, distance, or other attribute associated with the node 1608. A speech output can be spoken word audio that provides information about an element of the node-link diagram 1602. For example, a speech output can indicate a relative position of the node 1608 to the virtual reference point 1606. Additionally or alternatively, a speech output can indicate a label, type, value, bearing, distance, or other attribute associated with the node 1608.

In some examples, the user interface 1600 may also visually indicate attributes of the elements in the node-link diagram 1602. For example, each node may have a corresponding icon and label indicating one or more attributes of the node. The links may also have corresponding labels and/or icons indicating attributes thereof. Other visual characteristics of the nodes and links may be configured to indicate attributes of the nodes and links. As one particular example, in FIG. 16, the user interface 1600 may be part of a fraud detection system (e.g., for detecting fraud in transactions). The fraud detection system can collect, group, and analyze various types of data elements in an effort to detect fraud. The user interface 1600 can have a node-link diagram 1602 indicating relationships between various data elements for assisting an auditor in fraud detection. In the depicted example, the nodes represent six different types of data elements: a name, a home address, a telephone number, an e-mail address, a social security number, and an account number. Of course, other types of data elements may also be possible. Each node has an icon indicating which type of data element that it represents and a corresponding label indicating a value for the data element.

Upon the virtual control element 1612 contacting an element of the node-link diagram 1602, one or more attributes of the contacted element may be visually output in a frame 1610 of the user interface 1600. For example, the frame 1610 may be updated to include a textual description of one or more attributes of a contacted node 1608. In the example shown in FIG. 16, the textual description specifies the account number associated with the node 1608, the type of data element ("individual account") associated with the node 1608, and the number of adjacent nodes ("2 adjacent") that are directly connected to the node 1608 by links. This visual information may compliment the auditory feedback and may help sighted users or partially sighted users, who may not understand the audio feedback, inspect the node-link diagram 1602.

In some examples, the user can initiate one or more application-specific actions or domain-specific actions with respect to a contacted element by pressing a button. For example, the user may press a button while the virtual control element 1612 is contacting a node 1608 to execute an application-specific function relating to the node 1608. In the context of a fraud detection system, one example of the function may involve the execution of a fraud analysis routine on the account number associated with node 1608. In the context of a computer security system, one example of the function may involve the execution of a vulnerability scanning routine on a computing device associated with the node 1608. As another example, the user may press a button while the virtual control element 1612 is contacting a link between two nodes to execute an application-specific function relating to the link. In the context of a computer security system, one example of the function may involve the execution of a simulated login attempt between two computing devices represented by the two nodes, where one of the computing devices is commanded to attempt to login to the other computing device using certain authentication credentials.

In some examples, the user can customize the node-link diagram 1602 as desired. For example, the user interface 1600 may include a toolbox 1616 from which a user can selectively drag-and-drop nodes onto a canvas region 1614 of the user interface 1600. The user may then be able to draw links between the nodes, thereby generating at least a subpart of the node-link diagram 1602. The user may also be able to drag-and-drop existing elements in the canvas region 1614 to move them around as desired. The user may further be able to selectively delete nodes and links from the canvas region 1614. In this way, the user can selectively add elements to the node-link diagram 1602, move elements in the node-link diagram 1602, and delete elements from the node-link diagram 1602.

The user interface 1600 can be a compact, high contrast, adjustable visual that is designed to meet the needs of a visually impaired user. As noted above, the user interface 1600 can include a settings button 1604 that is selectable to access a settings interface, through which various aspects of the user interface 1600 can be customized by the user. For example, a user can interact with the settings interface to customize one or more visual settings of the user interface 1600. The visual settings can include contrasts, fonts, colors, sizes, and shapes of elements in the user interface 1600. Examples of such elements can include the nodes and links of the node-link diagram 1602, the frame 1610, the virtual control element 1612, and the labels associated with the nodes. Such visual customizations can improve perception of the node-link diagram 1602 for a visually impaired user.

A user can also interact with the settings interface to customize one or more audio settings of the user interface 1600. For example, the user may be able to turn on/off sonified outputs and turn on/off speech outputs via the settings interface. The user may also be able to customize the information that is provided via sonified outputs and speech outputs. For example, the settings interface can include multiple speech-output settings, where each speech-output setting can provide a different amount of information to the user as compared to the other speech-output settings. Examples of such speech-output settings can be a terse setting (e.g., in which only one or two attributes of a contacted element are output) and a verbose setting (e.g., in which three or more attributes of a contacted element are output). A user may be able to select among the speech-output settings as desired. Having different audio settings may allow the user to customize the amount and types of information received via audio feedback.

A user may interact with the user interface 1600 by providing user input to the processing device via a user input device. Examples of the user input device can include a touch-screen display, a mouse, a keyboard, a joystick, a gamepad, a game controller, a camera, a 3D imaging system (e.g., the Microsoft Kinect®), a LED-based tracking system, a pointing device (e.g., a body part, cane, stylus, or wand), or any combination of these. In some examples, the user can perform pan and zoom operations in relation to the node-link diagram 1602 by providing user input to the processing device via the user input device. For example, the user can manipulate a first control element of the user input device to move the virtual control element 1612 within the node-link diagram 1602. An example of the first control element may be a directional stick of a gamepad. In response to detecting the manipulation of the first control element, the user input device can transmit a first control signal to the processing device for causing the processing device to move the virtual control element 1612 in the node-link diagram 1602. Additionally or alternatively, the user can manipulate a second control element of the user input device to pan the node-link diagram 1602 in one or more directions. An example of the second control element may be another directional stick of the gamepad. In response to detecting the manipulation of the second control element, the user input device can transmit a second control signal to the processing device for causing the processing device to pan the node-link diagram 1602 in the one or more directions. Additionally or alternatively, the user can manipulate a third control element of the user input device to adjust a zoom level of the node-link diagram 1602 (e.g., zoom in or out on the node-link diagram by a predefined amount). In response to detecting the manipulation of the third control element, the user input device can transmit a third control signal to the processing device for causing the processing device to adjust the zoom level of the node-link diagram 1602 accordingly. The user input device can have any suitable number and configuration of control elements for enabling the user to perform any number and combination of input operations.

Figure 17A:
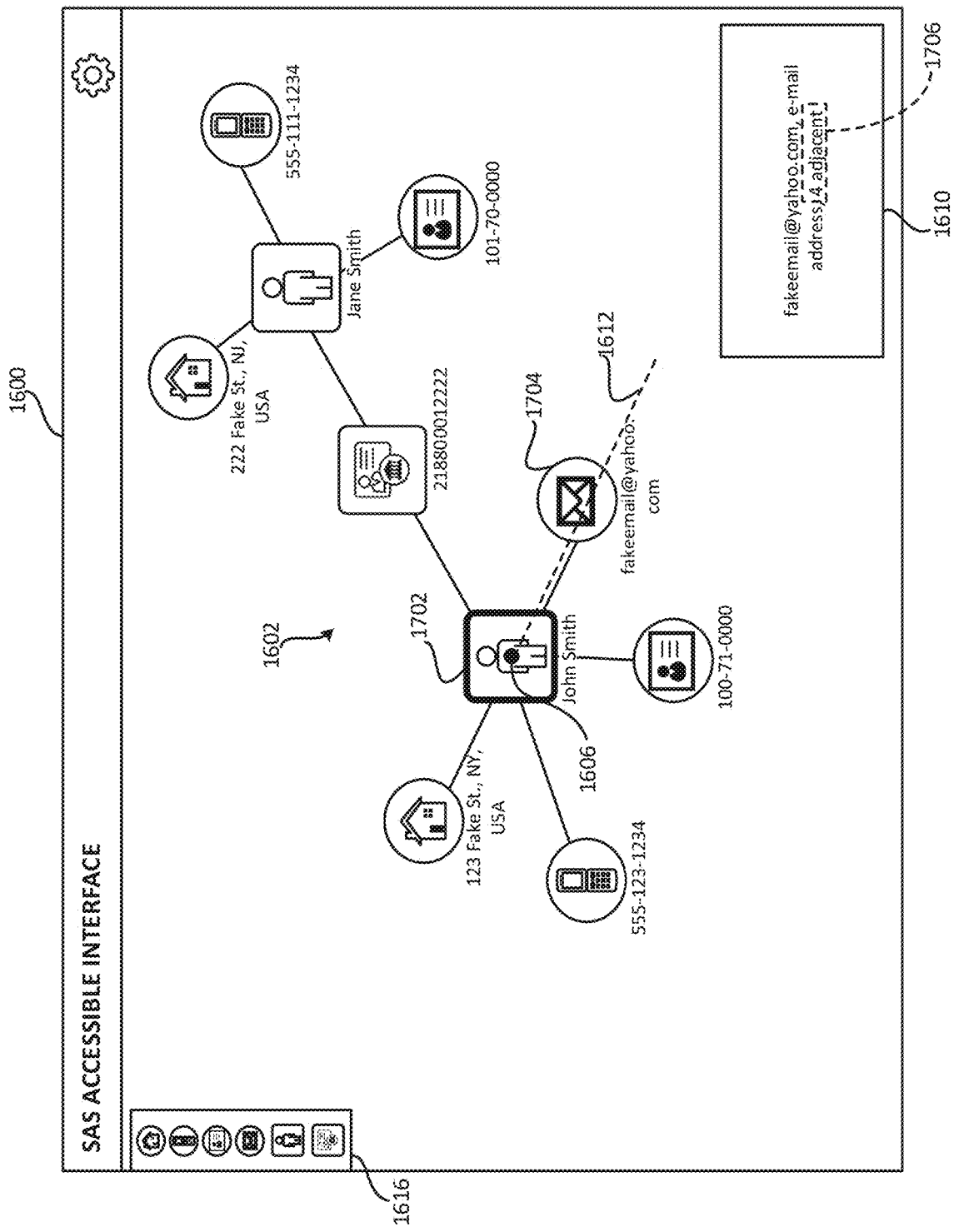
FIGS. 17A-B show an example of a process for importing additional data into a node-link diagram according to some aspects.

In some examples, a user may be able to move the focal point of the user interface 100 to a node. For example, as shown in FIG. 17A, the user may select the node 1702 and responsively move the virtual reference point 1606 to that node 1702. Doing so may make the node 1702 the focal point of the node-link diagram 1602, as indicated by the bolded outline of node 1702. The user may then be able to rotate the virtual control element 1612 around the virtual reference point 1606 to interact with other elements of the node-link diagram 1602. In the example shown in FIG. 17A, the virtual control element 1612 has contacted the node 1704, so auditory feedback may be output indicating one or more attributes of the node 1704. The frame 1610 may also be updated to include a textual description of one or more attributes of the node 1704.

Figure 17B:
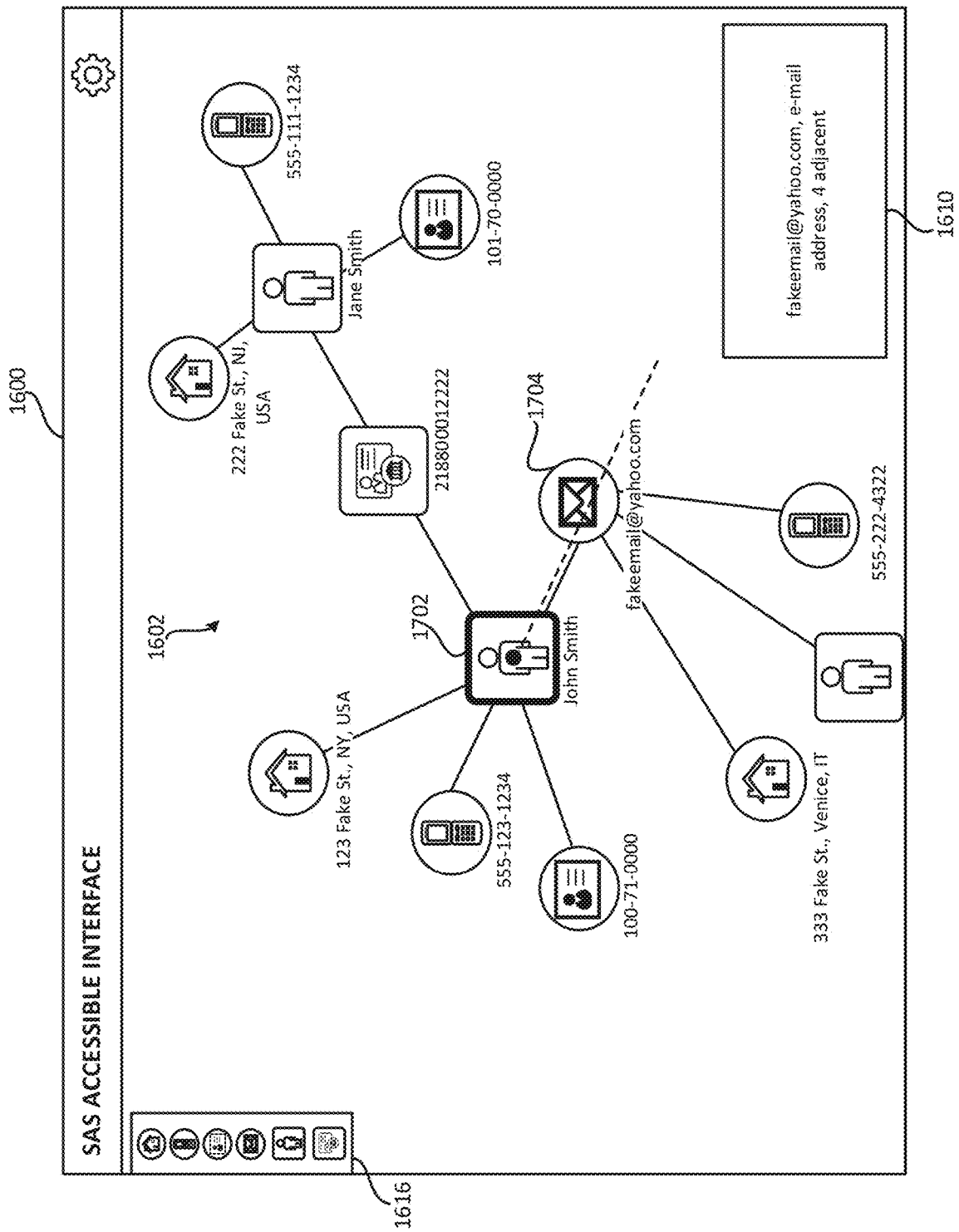

In some examples, the user interface 1600 can indicate whether a contacted node 1704 is associated with one or more other objects that are not currently displayed in the node-link diagram 1602. For example, the frame 1610 may include an attribute 1706 indicating that there are a certain number of adjacent objects to the contacted node 1704. An "adjacent object" can be an object that is directly connected to a node. Alternatively, a popup notification may be provided indicating that there are a certain number of adjacent objects to the contacted node 1704. Any suitable type of indicator may be used. If fewer than all of the adjacent objects associated with the contacted node 1704 are currently shown in the node-link diagram 1602, the user can select to have some or all of the remaining objects imported and displayed (e.g., as nodes and links) in the node-link diagram 1602. This may expand the overall size of the node-link diagram 1602, as shown in FIG. 17B. Thus, the node-link diagram 1602 may begin in a contracted state (e.g., to conserve space or focus on the most important information) and allow the user to selectively jump to nodes and/or import additional information, thereby expanding the size of the node-link diagram 1602 as desired.

The principles described herein can be applied to a wide range of application domains and types of node-link diagrams. Some other examples of types of node-link diagrams will now be described with respect to FIGS. 18-20.

Figure 18:
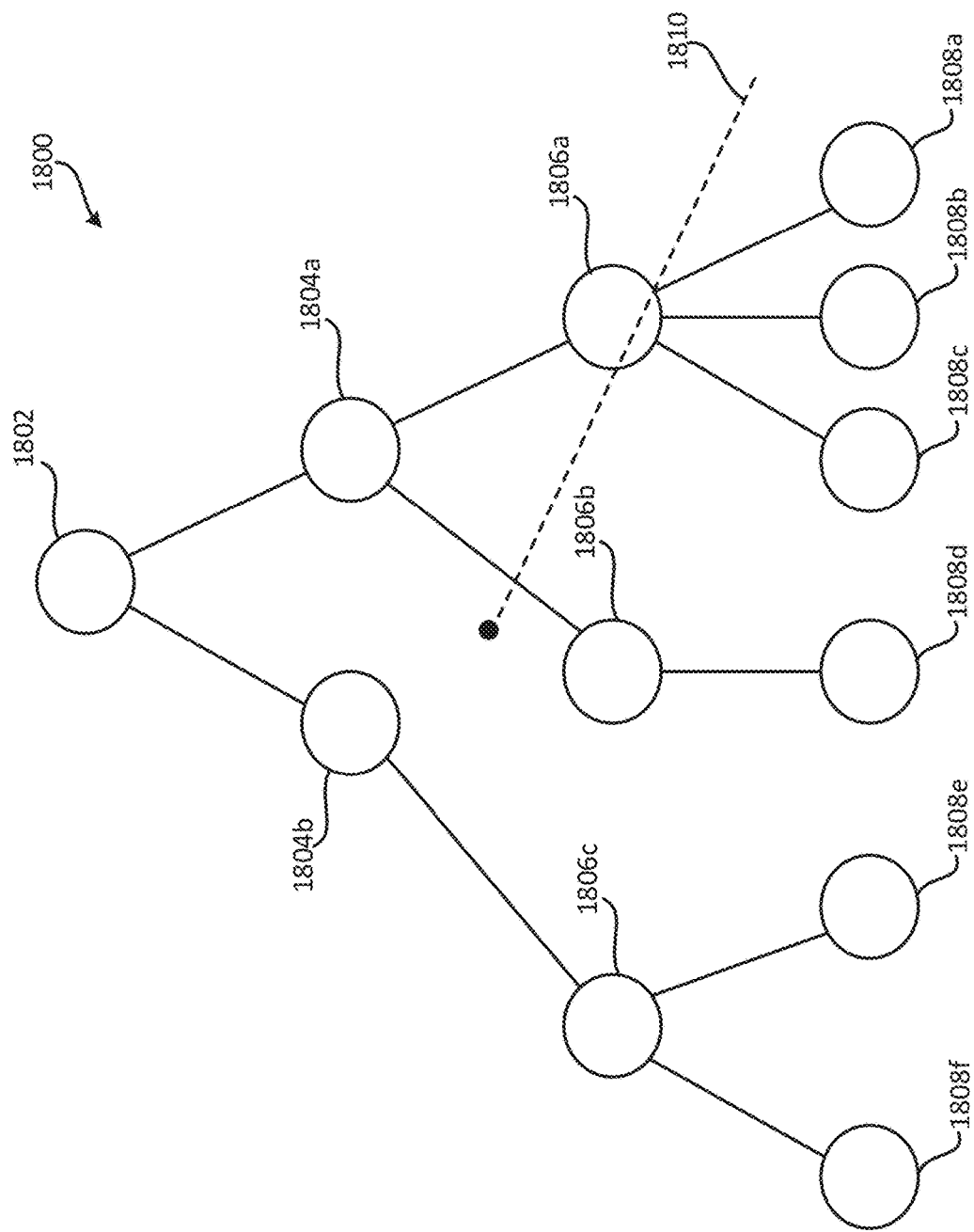
FIG. 18 shows an example of one type of node-link diagram according to some aspects.

Referring to FIG. 18, shown is a user interface 1800 that includes a node-link diagram in the form of a decision tree. A decision tree diagram is a tree-like model mapping the possible outcomes of a series of related choices. The tree often starts with a single node which then branches into possible outcomes. In predictive modeling, decision trees may also be used for solving classification or regression problems and the diagram can be used to visualization those models.

In general, a decision tree has a root node 1802 and leaf nodes 1808a-f. Between the root node 1802 and the leaf nodes 1808a-f can be intermediate nodes 1804a-b, 1806a-c. There is a hierarchical relationship between the nodes of the tree. For example, the root node 1802 can be considered a parent of all subsequent nodes. The intermediate nodes 1804a-b can be considered children of the parent node 1802 and parents of the intermediate nodes 1806a-c. The intermediate nodes 1806a-c can be considered children of the intermediate nodes 1804a-b and parents of the leaf nodes 1808a-f. The leaf nodes 1808a-f can be considered children of the intermediate nodes 1806a-c.

In some examples, the user interface 1800 can also include a virtual control element 1810 that is rotatable around a virtual reference point. The user interface 1800 can operate substantially as described above. For example, the user interface 1800 may generate auditory output in response to contacts between the virtual control element 1810 and the elements (e.g., nodes or links) of the decision tree. The user interface 1800 may also allow the user to jump between nodes, group together nodes, ungroup nodes, import data to expand the tree, and traverse the tree. Through the user interface 1800, a visually impaired user may be able to quickly digest the entire decision tree to perceive the general layout of the nodes and links, jump to the root node and then systematically traverse the tree, and build a mental model of the model that is represented within the tree. A visually impaired user may also be able to perceive the salient characteristics of individual nodes and links as well as both their semantic and spatial relationship to each other.

Figure 19:
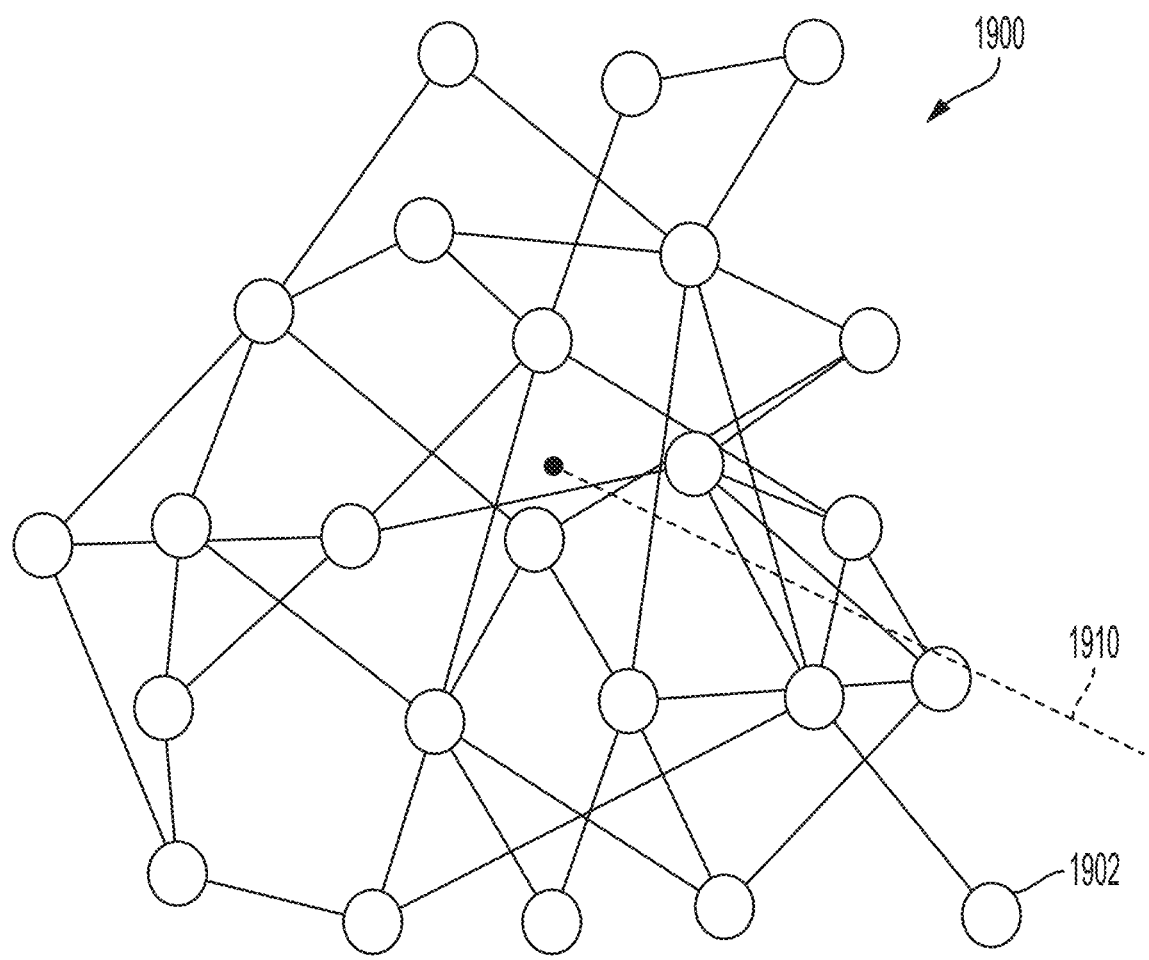
FIG. 19 shows an example of another type of node-link diagram according to some aspects.

FIG. 19 shows a user interface 1900 that includes a node-link diagram in the form of a network diagram. The network diagram includes nodes 1902 connected via links. The links may be directed, bi-directed, or un-directed to indicate the relationships between nodes 1902. Although all of the nodes 1902 are represented as circles in this example, the nodes may also be visually represented as different shapes/icons to indicate different types of objects. In addition, both nodes and links may presented using different colors, icons, and other visual characteristics that convey meaning via the visual mode of perception. Network diagrams are often used to visualize computer networks, neural networks used in machine learning, or social networks.

In some examples, the user interface 1900 can also include a virtual control element 1910 that is rotatable around a virtual reference point. The user interface 1900 can operate substantially as described above. For example, the user interface 1900 may generate auditory output in response to contacts between the virtual control element 1910 and the elements (e.g., nodes or links) of the network diagram. The user interface 1900 may also allow the user to jump between nodes, group together nodes, ungroup nodes, import data to expand the network diagram, and traverse the network diagram. Through the user interface 1900, a visually impaired user may be able to quickly digest the entire network diagram to perceive the general layout of the nodes and links; locate specific nodes or links of interest based on their salient characteristics, which may include their cardinality, centrality, type, or any other characteristic that is presented using visual properties; jump to the specific nodes of interest and then explore/traverse the diagram; and select one or more nodes to delete them, move them, or perform application-specific actions with respect to them.

Figure 20:
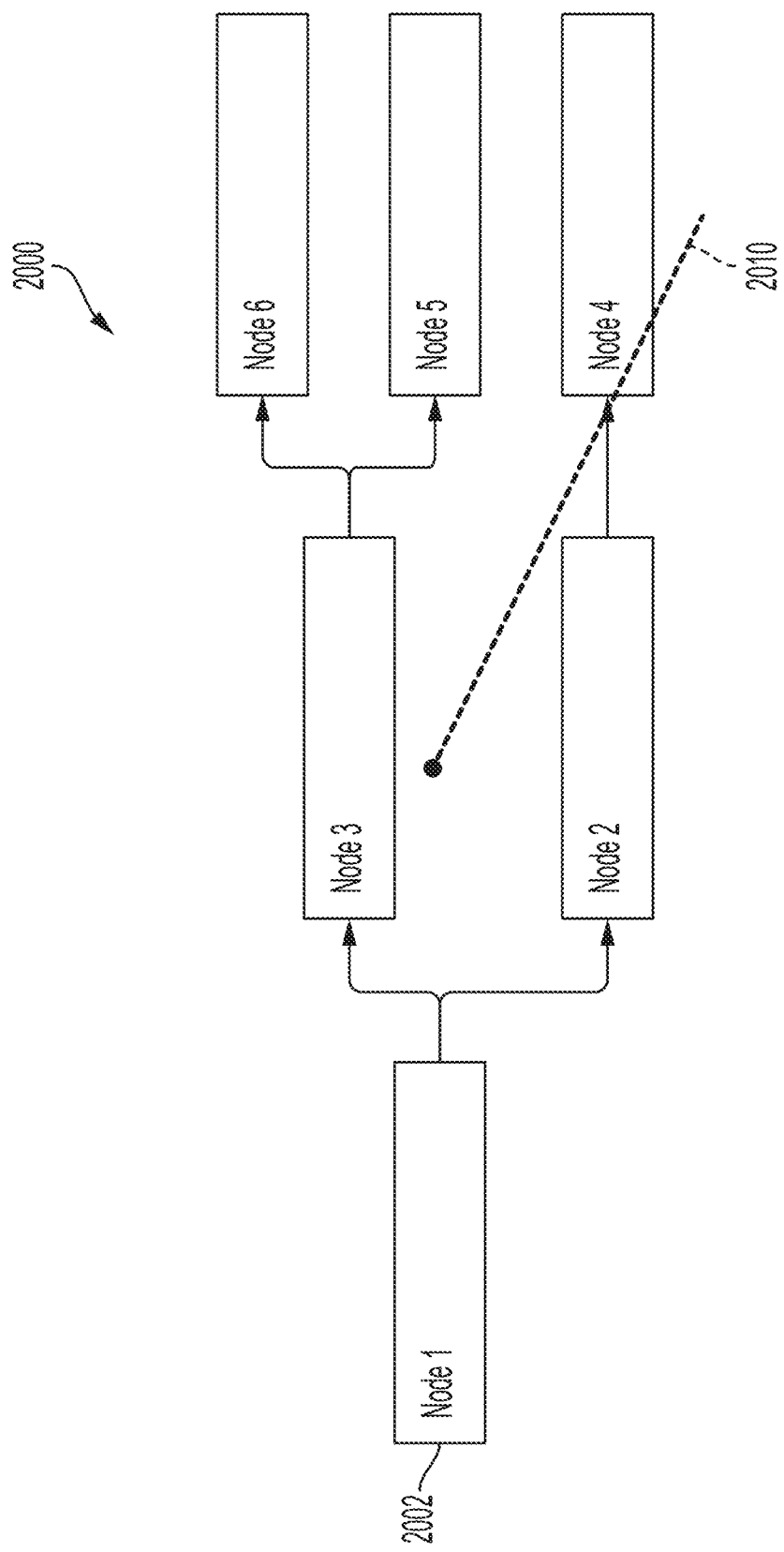
FIG. 20 shows an example of still another type of node-link diagram according to some aspects.

FIG. 20 shows a user interface 2000 that includes a node-link diagram in the form of a process flow diagram. The process flow diagram includes nodes 2002 and links to represent the flow and the relationship between different objects. A process flow diagram is sometimes used in mechanical and industrial settings to indicate the flow of industrial facility processes and relationship between equipment/devices. They may also be used to represent business processes, such as the steps that are required to conform with financial accounting regulations at the end of a fiscal quarter or year.

In some examples, the user interface 2000 can also include a virtual control element 2010 that is rotatable around a virtual reference point. The user interface 2000 can operate substantially as described above. For example, the user interface 2000 may generate auditory output in response to contacts between the virtual control element 2010 and the elements (e.g., nodes or links) of the process flow diagram. The user interface 2000 may also allow the user to jump between nodes, group together nodes, ungroup nodes, import data to expand the process flow diagram, and traverse the process flow diagram. Through the user interface 2000, a visually impaired user may be able to quickly digest the entire process flow diagram to perceive the general layout of the nodes and links; locate specific nodes or links of interest, such as a start node or terminal node, based on their salient characteristics; jump to the specific nodes of interest and then explore/traverse the diagram; while traversing the diagram, perceive relationships and meaning with the data that is modelled by the diagram; and select one or more nodes to delete them, move them, or perform application-specific actions with respect to them.

Figure 21:
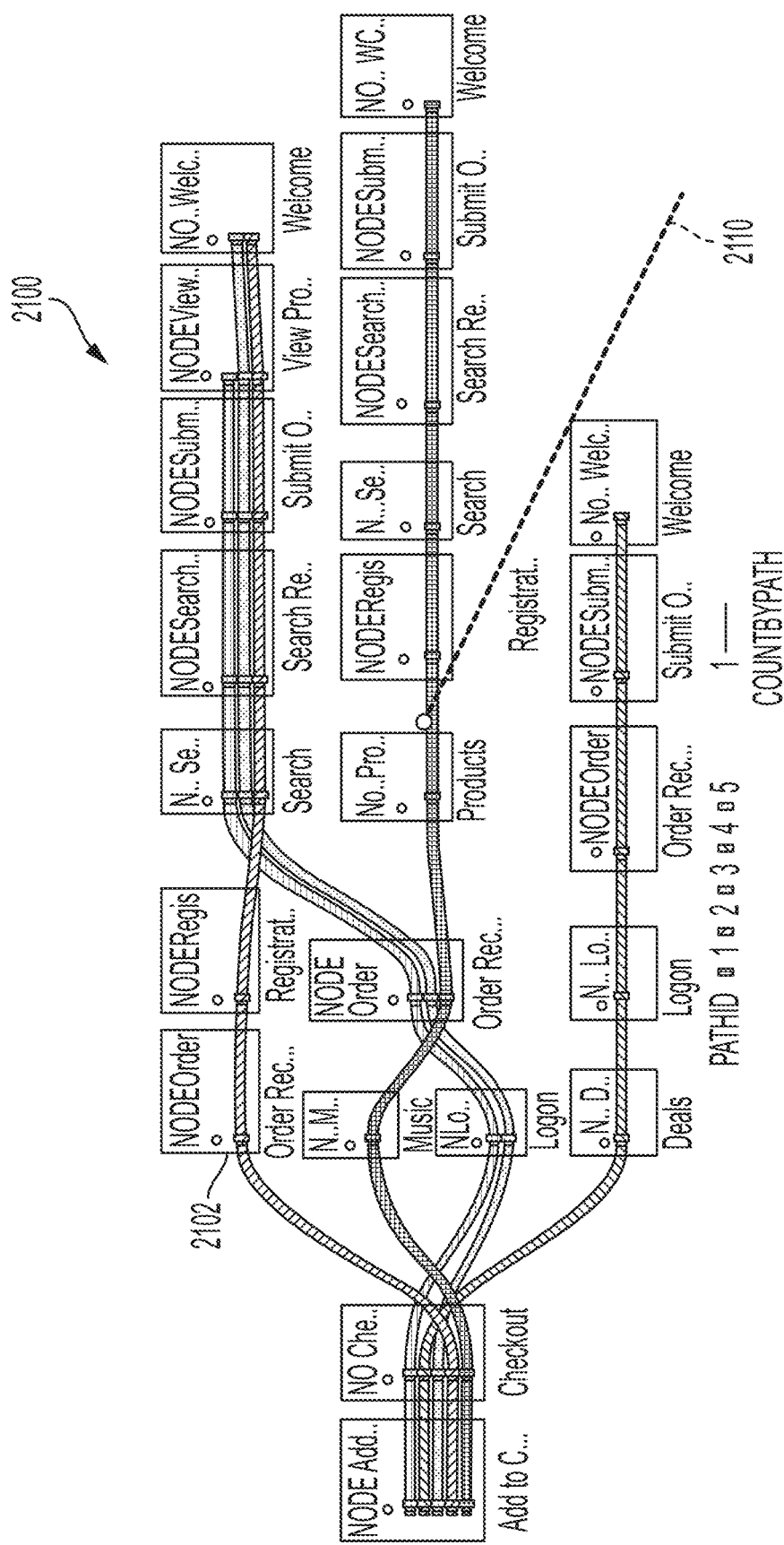
FIG. 21 shows an example of yet another type of node-link diagram according to some aspects.

FIG. 21 shows a user interface 2100 that includes a node-link diagram in the form of a Sankey diagram. The Sankey diagram includes nodes 2102 and links (e.g., arrows). The Sankey diagram visualizes flow, where the size of a link is indicative of the flow rate between nodes. The purpose of Sankey diagrams can be to emphasize the major transfers of flow within a given system or network.

In some examples, the user interface 2100 can also include a virtual control element 2110 that is rotatable around a virtual reference point. The user interface 2100 can operate substantially as described above. For example, the user interface 2100 may generate auditory output in response to contacts between the virtual control element 2110 and the elements (e.g., nodes or links) of the Sankey diagram. The user interface 2100 may also allow the user to jump between nodes, group together nodes, ungroup nodes, import data to expand the Sankey diagram, and traverse the Sankey diagram. Through the user interface 2100, a visually impaired user may be able to quickly digest the entire Sankey diagram to perceive the general layout of the nodes and links; locate specific nodes or links of interest based on their salient characteristics, which may include the size of flow between nodes; jump to the specific nodes of interest and then explore/traverse the diagram; while traversing the Sankey diagram, perceive how flow moves through the diagram; and select one or more nodes to delete them, move them, or perform application-specific actions with respect to them.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A non-transitory computer-readable medium comprising program code that is executable by one or more processors for causing the one or more processors to:
   generate a graphical user interface depicting a node-link diagram having nodes and links between the nodes, the graphical user interface including a virtual reference point in the node-link diagram and a virtual control element that is rotatable around the virtual reference point by a user to contact one or more of the nodes in the node-link diagram, wherein the virtual reference point and the virtual control element are distinct from the nodes in the node-link diagram;
   receive user input for rotating the virtual control element around the virtual reference point in an amount that generates a contact between the virtual control element and a particular node of the node-link diagram; and
   in response to detecting the contact between the virtual control element and the particular node in the node-link diagram:
      determine a sound characteristic for a sound configured to indicate an attribute associated with the particular node; and
      transmit an audio signal to an audio device, the audio signal being configured to cause the audio device to generate the sound having the sound characteristic to assist the user in exploring the node-link diagram.

2. The non-transitory computer-readable medium of claim 1, wherein the sound is a tone, and wherein the sound characteristic is a pitch, pan setting, magnitude, or duration of the tone.

3. The non-transitory computer-readable medium of claim 1, wherein the sound is a speech output, and wherein the sound characteristic is verbal speech describing the attribute.

4. The non-transitory computer-readable medium of claim 1, wherein the attribute is a number of nodes that are adjacent to the particular node in the node-link diagram.

5. The non-transitory computer-readable medium of claim 1, wherein the attribute is a spatial position of the particular node with respect to the virtual reference point in the node-link diagram.

6. The non-transitory computer-readable medium of claim 1, further comprising program code that is executable by the one or more processors for causing the one or more processors to:
   receive a user selection of the particular node; and
   in response to receiving the user selection, move the virtual reference point to the particular node in the node-link diagram and designate the particular node as a focal point of the node-link diagram.

7. The non-transitory computer-readable medium of claim 6, wherein the user input is a first user input, and further comprising program code that is executable by the one or more processors for causing the one or more processors to, while the particular node is designated as the focal point:
   receive a second user input for rotating the virtual control element around the virtual reference point;
   based on receiving the second user input, rotate the virtual control element around the virtual reference point such that the virtual control element jumps from a first node that is adjacent to the particular node in the node-link diagram to a second node that is adjacent to the particular node in the node-link diagram, without contacting a first intervening region of the node-link diagram that is between the first node and the second node;
   receive a third user input for further rotating the virtual control element around the virtual reference point; and
   based on receiving the third user input, further rotate the virtual control element around the virtual reference point such that the virtual control element jumps from the second node to a third node that is adjacent to the particular node in the node-link diagram, without contacting a second intervening region of the node-link diagram that is between the second node and the third node.

8. The non-transitory computer-readable medium of claim 6, further comprising program code that is executable by the one or more processors for causing the one or more processors to, while the particular node is designated as the focal point
   detect another contact between the virtual control element and an adjacent node that is adjacent to the particular node in the node-link diagram;
   in response to detecting the other contact, generate an output indicating that the adjacent node is associated with other objects that are not displayed in the node-link diagram:
   subsequent to generating the output, receive another user input for updating the node-link diagram to incorporate the other objects; and
   in response to receiving the other user input, update the node-link diagram to incorporate the other objects and corresponding links.

9. The non-transitory computer-readable medium of claim 1, wherein the nodes represent objects and the links represent relationships between the objects.

10. The non-transitory computer-readable medium of claim 9, wherein the objects correspond to different types of data elements of a fraud detection system.

11. The non-transitory computer-readable medium of claim 1, wherein the links represent objects and the nodes represent relationships between the objects.

12. The non-transitory computer-readable medium of claim 11, wherein the links correspond to roads in a geographical region and the nodes correspond to intersections between the roads in the geographical region.

13. The non-transitory computer-readable medium of claim 1, wherein the user input is a first user input, and further comprising program code that is executable by the one or more processors for causing the one or more processors to:
receive second user input for rotating the virtual control element around the virtual reference point in another amount that generates another contact between the virtual control element and a particular link of the node-link diagram; and
in response to detecting the contact between the virtual control element and the particular link in the node-link diagram:
determine another sound characteristic for another sound configured to indicate an attribute associated with the particular link; and
transmit another audio signal to the audio device, the other audio signal being configured to cause the audio device to generate the other sound having the other sound characteristic.

14. The non-transitory computer-readable medium of claim 1, further comprising program code that is executable by the one or more processors for causing the one or more processors to enable the user to selectively add one or more nodes and one or more links to the node-link diagram.

15. The non-transitory computer-readable medium of claim 1, further comprising program code that is executable by the one or more processors for causing the one or more processors to enable the user to selectively remove one or more nodes and one or more links from the node-link diagram.

16. A method comprising:
generating, by one or more processors, a graphical user interface depicting a node-link diagram having nodes and links between the nodes, the graphical user interface including a virtual reference point in the node-link diagram and a virtual control element that is rotatable around the virtual reference point by a user to contact one or more of the nodes in the node-link diagram, wherein the virtual reference point and the virtual control element are distinct from the nodes in the node-link diagram;
receiving, by the one or more processors, user input for rotating the virtual control element around the virtual reference point in an amount that generates a contact between the virtual control element and a particular node of the node-link diagram; and
in response to detecting the contact between the virtual control element and the particular node in the node-link diagram:
determining, by the one or more processors, a sound characteristic for a sound configured to indicate an attribute associated with the particular node; and
transmitting, by the one or more processors, an audio signal to an audio device, the audio signal being configured to cause the audio device to generate the sound having the sound characteristic to assist the user in exploring the node-link diagram.

17. The method of claim 16, wherein the sound is a tone, and wherein the sound characteristic is a pitch, pan setting, magnitude, or duration of the tone.

18. The method of claim 16, wherein the sound is a speech output, and wherein the sound characteristic is verbal speech describing the attribute.

19. The method of claim 16, wherein the attribute is a number of nodes that are adjacent to the particular node in the node-link diagram.

20. The method of claim 16, wherein the attribute is a spatial position of the particular node with respect to the virtual reference point in the node-link diagram.

21. The method of claim 16, further comprising:
receiving a user selection of the particular node; and
in response to receiving the user selection, moving the virtual reference point to the particular node in the node-link diagram and designate the particular node as a focal point of the node-link diagram.

22. The method of claim 21, wherein the user input is a first user input, and further comprising, while the particular node is designated as the focal point:
receiving a second user input for rotating the virtual control element around the virtual reference point;
based on receiving the second user input, rotating the virtual control element around the virtual reference point such that the virtual control element jumps from a first node that is adjacent to the particular node in the node-link diagram to a second node that is adjacent to the particular node in the node-link diagram, without contacting a first intervening region of the node-link diagram that is between the first node and the second node;
receiving a third user input for further rotating the virtual control element around the virtual reference point; and
based on receiving the third user input, further rotating the virtual control element around the virtual reference point such that the virtual control element jumps from the second node to a third node that is adjacent to the particular node in the node-link diagram, without contacting a second intervening region of the node-link diagram that is between the second node and the third node.

23. The method of claim 21, further comprising, while the particular node is designated as the focal point:
detecting another contact between the virtual control element and an adjacent node that is adjacent to the particular node in the node-link diagram:
in response to detecting the other contact, generating an output indicating that the adjacent node is associated with other objects that are not displayed in the node-link diagram;
subsequent to generating the output, receiving another user input for updating the node-link diagram to incorporate the other objects; and
in response to receiving the other user input, updating the node-link diagram to incorporate the other objects and corresponding links.

24. The method of claim 16, wherein the nodes represent objects and the links represent relationships between the objects.

25. The method of claim 16, wherein the links represent objects and the nodes represent relationships between the objects.

26. The method of claim 25, wherein the links correspond to roads in a geographical region and the nodes correspond to intersections between the roads in the geographical region.

27. The method of claim 16, wherein the user input is a first user input, and further comprising:
receiving second user input for rotating the virtual control element around the virtual reference point in another amount that generates another contact between the virtual control element and a particular link of the node-link diagram; and in response to detecting the contact between the virtual control element and the particular link in the node-link diagram:

determining another sound characteristic for another sound configured to indicate an attribute associated with the particular link; and transmitting another audio signal to the audio device, the other audio signal being configured to cause the audio device to generate the other sound having the other sound characteristic.

28. The method of claim 16, further comprising enabling the user to selectively add one or more nodes and one or more links to the node-link diagram.

29. The method of claim 16, further comprising enabling the user to selectively remove one or more nodes and one or more links from the node-link diagram.

30. A system comprising:
one or more processors; and
one or more memories storing instructions that are executable by the one or more processors for causing the one or more processors to:
generate a graphical user interface depicting a node-link diagram having nodes and links between the nodes, the graphical user interface including a virtual reference point in the node-link diagram and a virtual control element that is rotatable around the virtual reference point by a user to contact one or more of the nodes in the node-link diagram, wherein the virtual reference point and the virtual control element are distinct from the nodes in the node-link diagram;

receive user input for rotating the virtual control element around the virtual reference point in an amount that generates a contact between the virtual control element and a particular node of the node-link diagram; and in response to detecting the contact between the virtual control element and the particular node in the node-link diagram:

determine a sound characteristic for a sound configured to indicate an attribute associated with the particular node; and transmit an audio signal to an audio device, the audio signal being configured to cause the audio device to generate the sound having the sound characteristic to assist the user in exploring the node-link diagram.

* * * * *